United States Patent
Nishita

(10) Patent No.: US 10,488,519 B2
(45) Date of Patent: Nov. 26, 2019

(54) POLYGON MIRROR, FAN BEAM OUTPUT DEVICE, AND SURVEY SYSTEM

(71) Applicant: TOPCON CORPORATION, Tokyo (JP)

(72) Inventor: Nobuyuki Nishita, Tokyo (JP)

(73) Assignee: TOPCON CORPORATION, Tokyo (JP)

(*) Notice: Subject to any disclaimer, the term of this patent is extended or adjusted under 35 U.S.C. 154(b) by 495 days.

(21) Appl. No.: 15/267,579

(22) Filed: Sep. 16, 2016

(65) Prior Publication Data

US 2017/0082748 A1 Mar. 23, 2017

(30) Foreign Application Priority Data

Sep. 17, 2015 (JP) ................. 2015-184389

(51) Int. Cl.
*G01S 17/48* (2006.01)
*G02B 26/12* (2006.01)
*G01S 17/89* (2006.01)

(52) U.S. Cl.
CPC ............ *G01S 17/48* (2013.01); *G02B 26/124* (2013.01); *G02B 26/127* (2013.01); *G01S 17/89* (2013.01)

(58) Field of Classification Search
CPC ................................. G03G 15/04; G02B 26/10
See application file for complete search history.

(56) References Cited

U.S. PATENT DOCUMENTS

| | | |
|---|---|---|
| 2005/0189469 A1 | 9/2005 | Sugiura |
| 2006/0197944 A1 | 9/2006 | Yasutomi et al. |
| 2007/0263202 A1 | 11/2007 | Ohtomo et al. |
| 2009/0235543 A1 | 9/2009 | Hayashi et al. |
| 2009/0252537 A1* | 10/2009 | Choi ............... G02B 5/09 399/221 |
| 2012/0262550 A1 | 10/2012 | Bridges |
| 2012/0262573 A1 | 10/2012 | Bridges |
| 2012/0262692 A1 | 10/2012 | Bridges et al. |
| 2012/0262693 A1 | 10/2012 | Mertz et al. |
| 2012/0262694 A1 | 10/2012 | Garey et al. |
| 2012/0262697 A1 | 10/2012 | Mertz et al. |
| 2012/0262698 A1 | 10/2012 | Day et al. |
| 2012/0262699 A1 | 10/2012 | Steffey |
| 2012/0262728 A1 | 10/2012 | Bridges et al. |

(Continued)

FOREIGN PATENT DOCUMENTS

| | | |
|---|---|---|
| EP | 1 061 335 | 12/2000 |
| JP | 2000-356518 | 12/2000 |

(Continued)

OTHER PUBLICATIONS

Office Action dated Aug. 20, 2018 in European Application No. 16188653.6.

(Continued)

*Primary Examiner* — Luke D Ratcliffe

(74) *Attorney, Agent, or Firm* — Wenderoth, Lind & Ponack, L.L.P.

(57) ABSTRACT

A polygon mirror includes a plurality of reflection surfaces formed in a circumference surface of the polygon mirror at equal intervals, and a surface processed part that reflects incident laser light to form a fan beam spreading in a predetermined direction, and the surface processed part being provided in each of the reflection surfaces.

4 Claims, 27 Drawing Sheets

(56) References Cited

U.S. PATENT DOCUMENTS

2012/0262730 A1  10/2012  Brown et al.
2012/0265479 A1  10/2012  Bridges
2017/0030705 A1   2/2017  Bridges

FOREIGN PATENT DOCUMENTS

| JP | 2005-214854 | 8/2005 |
| JP | 2009-229223 | 10/2009 |
| JP | 2009-251595 | 10/2009 |
| JP | 2014-515826 | 7/2014 |
| JP | 2015-114562 | 6/2015 |

OTHER PUBLICATIONS

Extended European Search Report dated May 19, 2017 in corresponding European Application No. 16188653.6.
Notification of Reasons for Refusal dated Apr. 23, 2019 in Japanese Patent Application No. 2015-184389, with English-language translation.

* cited by examiner

| | A1 | A2 | A3 |
|---|---|---|---|
| 122H1 | B1a | | |
| 122H2 | B2a | | |
| 122H3 | B3a | | |
| 122H4 | B4a | | |
| 122H5 | B5a | | |
| 122H6 | B6a | | |
| 122H7 | B7a | | |
| 122H8 | B8a | | |

1078

1078A

1078B

POLYGON MIRROR, FAN BEAM OUTPUT DEVICE, AND SURVEY SYSTEM

CROSS-REFERENCE TO RELATED APPLICATION

The present application is based on and claims priority to Japanese patent application No. 2015-184389, filed Sep. 17, 2015, the disclosure of which is hereby incorporated by reference herein in its entirety.

BACKGROUND

Technical Field

A fan beam output device that outputs a fan beam has been conventionally known by JP2000-356518A.

Description of Related Art

The fan beam output device includes a laser light source that emits laser light, a relay lens that changes the emitted laser light into parallel light flux, and a cylindrical lens that spreads the laser light of the parallel light flux to form a fan beam.

A survey system has been known by JP2005-214854A. In such a survey system, a fan beam output device is provided in a target device, a fan beam is output toward a survey instrument, and the fan beam is moved in a vertical direction for scanning, so as to direct a telescope of the survey instrument to a target.

In such a fan beam output device, a cylindrical lens is arranged between a polygon mirror and a relay lens (collimator lens).

The arrangement of the cylindrical lens increases the number of components of the fan beam device, and also requires a space.

SUMMARY

An object of the present invention is, therefore, to provide a polygon mirror capable of forming a fan beam for scanning without using a cylindrical lens, a fan beam output device using the polygon mirror, and a survey system using the fan beam output device.

To achieve the above object, an aspect of the present invention provides a polygon mirror including a plurality of reflection surfaces formed in a circumference surface of the polygon mirror at equal intervals, and a surface processed part that reflects incident laser light to form a fan beam spreading in a predetermined direction, and the surface processed part being provided in each of the reflection surfaces.

DETAILED DESCRIPTION

Hereinafter, embodiments of a survey system using a fan beam output device with a polygon mirror will be described with reference to the drawings.

Embodiment 1

Figure 1:
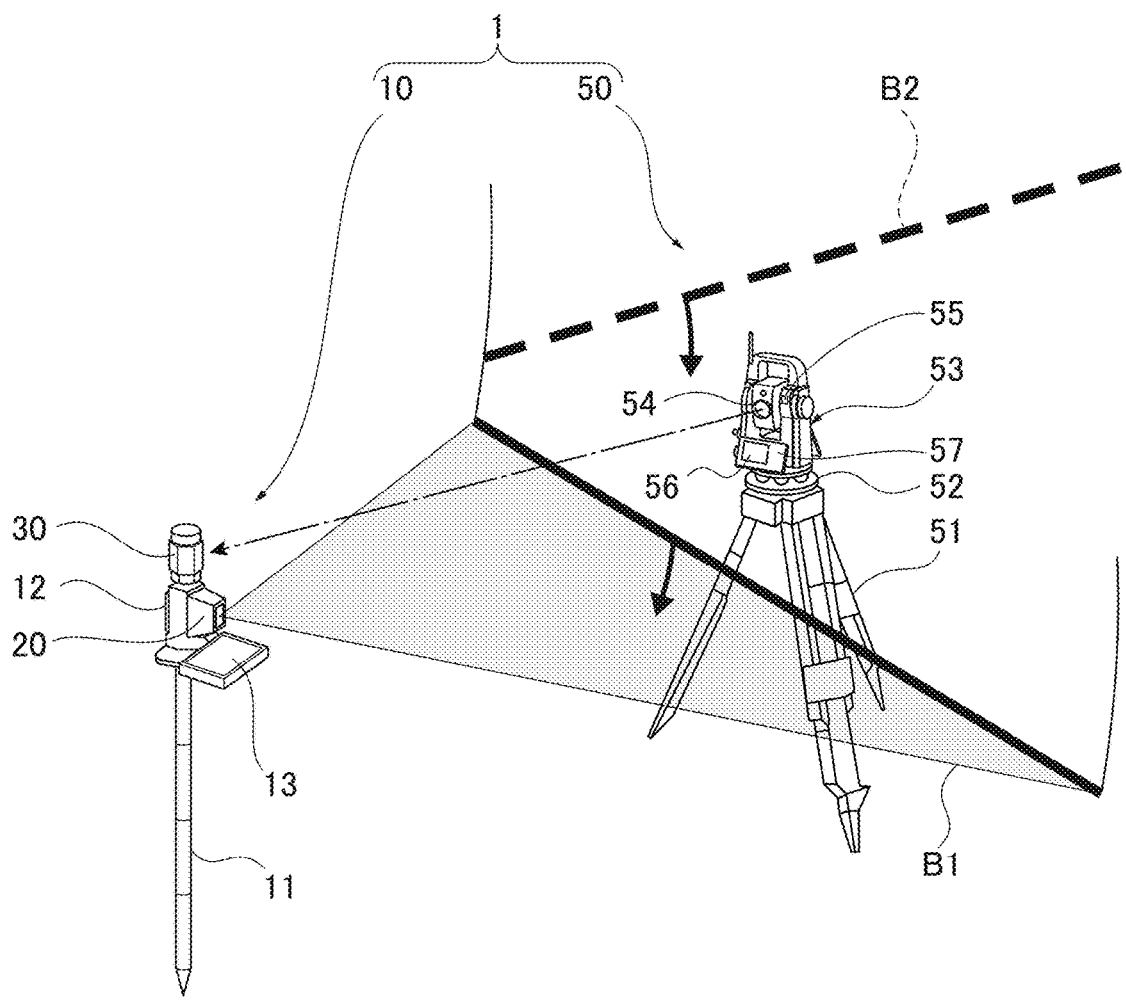
FIG. 1 is an explanation drawing illustrating a configuration of a survey system according to Embodiment 1, the survey system including a target device equipped with a polygon mirror according to an embodiment of the present invention and a survey instrument.

A survey system 1 illustrated in FIG. 1 includes a target device 10 and a survey instrument 50.

The survey instrument 50 will be described below. The survey instrument 50 includes a leveling base 52 fixed on a tripod 51, a main body 53 mounted on the leveling base 52 in a horizontally rotatable manner (rotatable about vertical axis line), and a telescope part 54 disposed in the main body 53 in a vertically rotatable manner (rotatable about horizontal axis line). A guide light receiving part 55 that receives fan beams B1 to B5 (refer to FIGS. 3 and 5) is provided in an upper portion of the main body 53. A display 56 and an operation part 57 are provided in a front lower portion of the main body 53.

Figure 2:
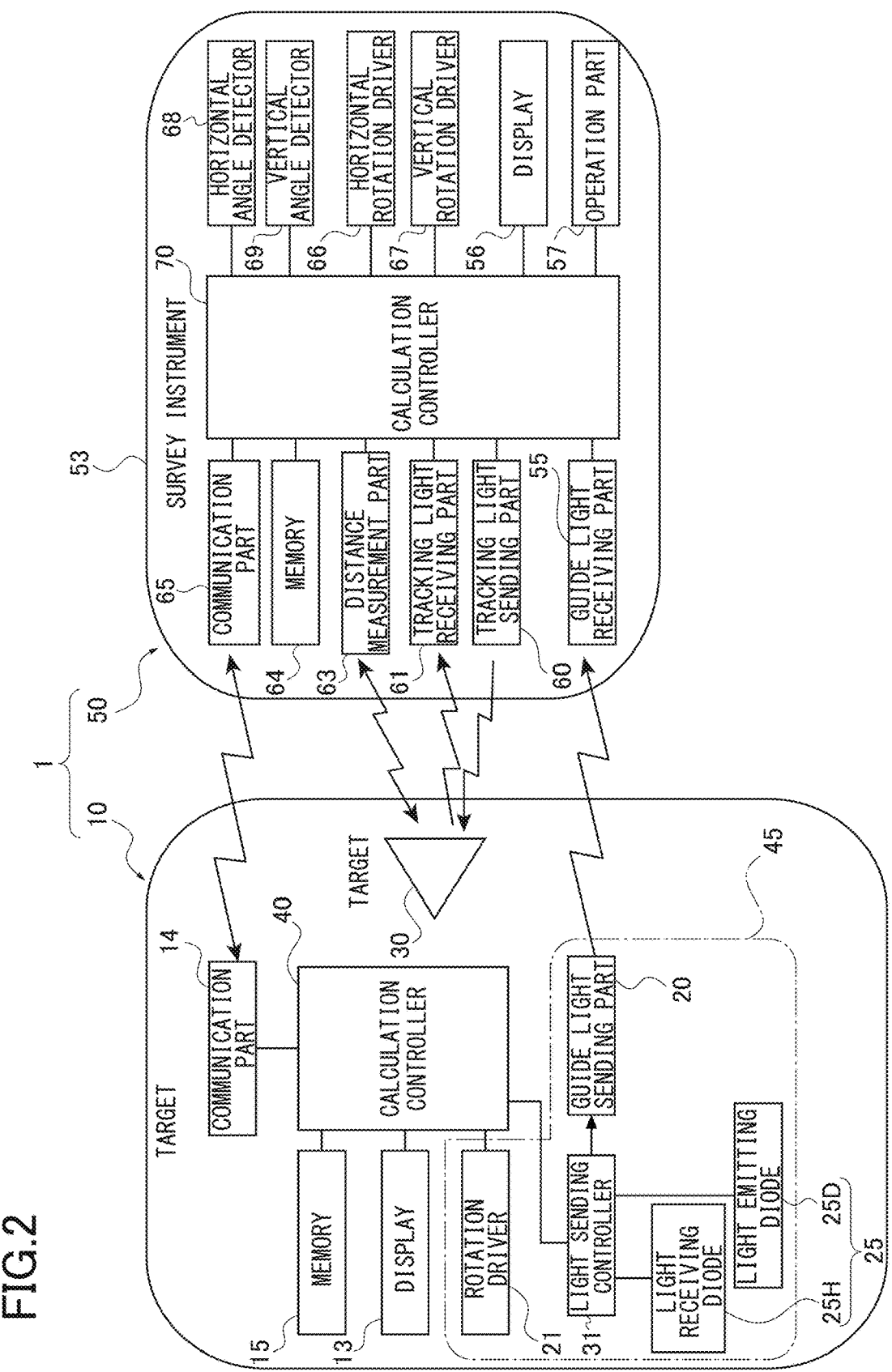
FIG. 2 is a block diagram illustrating a configuration of the target device and the survey instrument.

As illustrated in FIG. 2, the main body 53 includes a tracking light sending part 60 that irradiates tracking light toward a target 30 of the target device 10, a tracking light receiving part 61 that receives the tracking light reflected on the target 30 to automatically track the target 30, a horizontal angle detector 68 that detects a horizontal angle of the target 30 relative to a not-shown horizontal reference line based on the light received by the tracking light receiving part 61, a distance measurement part 63 that emits measurement light toward the target 30 and receives the measurement light reflected on the target 30 to obtain a distance to the target 30, a calculation controller 70 that calculates the position of the target 30 based on the distance obtained by the distance measurement part 63 and the horizontal angle detected by the horizontal angle detector 68, and a communication part 65 that sends data on the position of the target 30 calculated by the calculation controller 70.

Automatic tracking is to track the target 30 of the target device 10 by directing the telescope part 54 in the direction in which the image received by the tracking light receiving part 61 is located at a predetermined position.

The main body 53 includes a memory 64 that stores the distance obtained by the distance measurement part 63, the horizontal angle detected by the horizontal angle detector 68, and the position calculated by the calculation controller 70, a horizontal rotation driver 66 that horizontally rotates the main body 53 (refer to FIG. 1), a vertical rotation driver 67 that vertically rotates the telescope part 54, the horizontal angle detector 68 that detects a horizontal rotation angle of the main body 53, and a vertical angle detector 69 that detects a vertical rotation angle of the telescope part 54.

The calculation controller 70 controls the driving of the horizontal rotation driver 66 and the vertical rotation driver 67, and obtains an angle $\theta$ of a survey instrument direction from the target 30 to the survey instrument 50 relative to a reference line R1 (refer to FIG. 7C) indicating a previously set reference direction based on a light receiving timing of the fan beam B (refer to FIGS. 7A, 7B) received by the guide light receiving part 55.

The target device 10 will be described below. The target device 10 includes a pole 11, a casing 12 removably attached to an upper portion of the pole 11, a display 13 on which the reference line R1 indicating the previously set reference direction (refer to FIGS. 7C, 7D) and an obtained target position E1 are displayed, a guide light sending part 20, and the target 30 that reflects the tracking light along the incident direction. The target 30 is attached to the upper portion of the pole 11.

The display 13 and the guide light sending part 20 are integrally provided in the casing 12.

The target 30 is an all-around (360°) prism configured by providing a plurality of corner cube prisms over the entire circumference of the target 30. Therefore, the target 30 reflects the measurement light and the tracking light along the incident direction regardless of the incident direction of the measurement light and tracking light.

As illustrated in FIG. 2, the target device 10 includes a communication part 14 that communicates with the survey instrument 50, a memory 15 that stores measurement data sent from the survey instrument 50, a calculation controller 40, and a fan beam output device 45.

The communication part 14, a light sending controller 31, the calculation controller 40, and the fan beam output device 45 (except guide light sending part) are provided inside the casing 12.

Figure 7A:
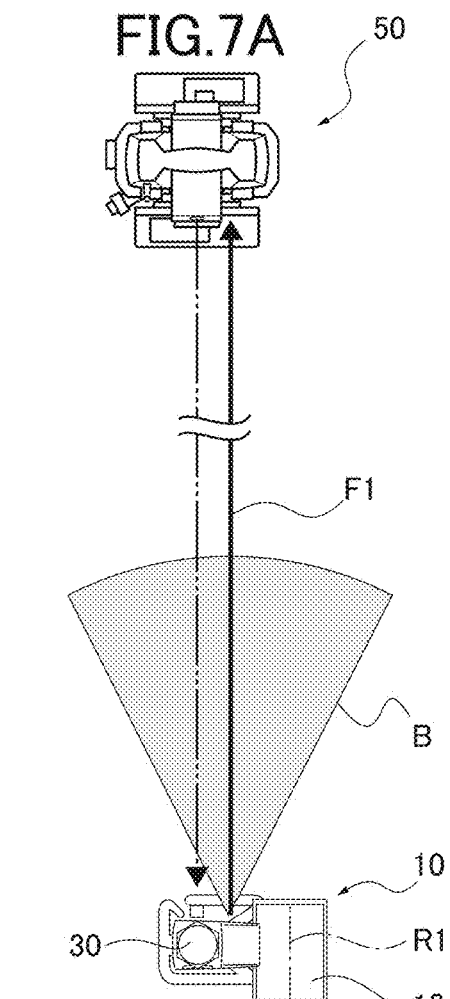
FIG. 7A is an explanation drawing illustrating the target device facing the survey instrument.
Figure 7B:
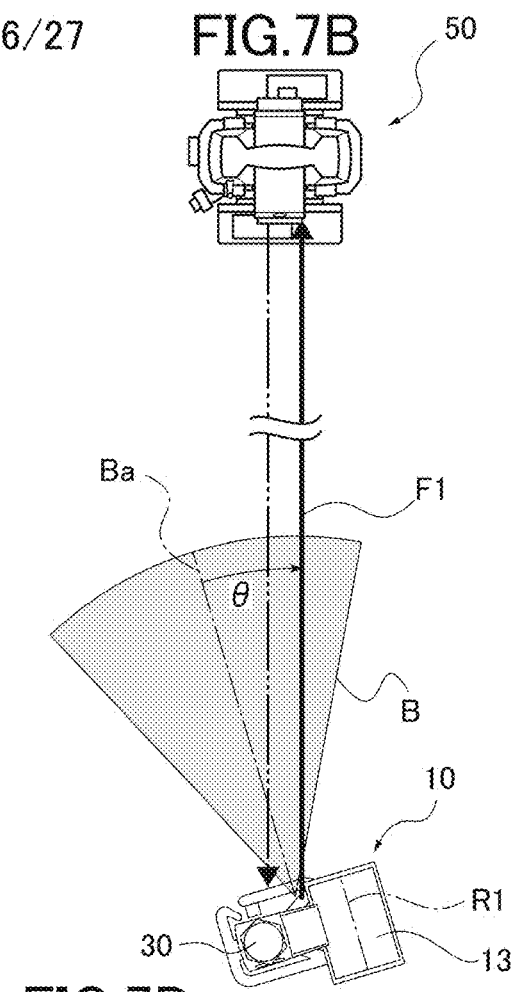
FIG. 7B is an explanation drawing illustrating the target device inclined at a predetermined angle relative to the survey instrument.
Figure 7C:
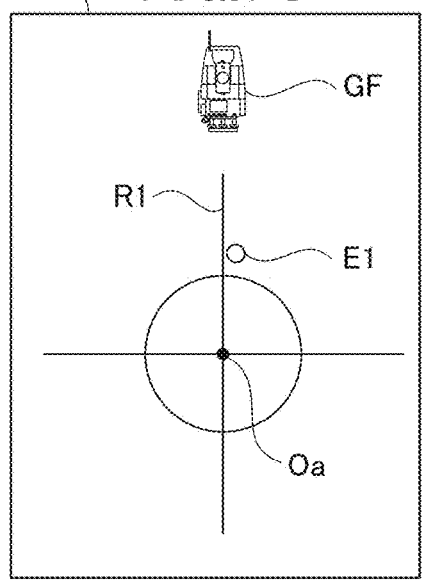
FIG. 7C is an explanation drawing illustrating a screen displayed on a display of the target device illustrated in FIG. 7A.
Figure 7D:
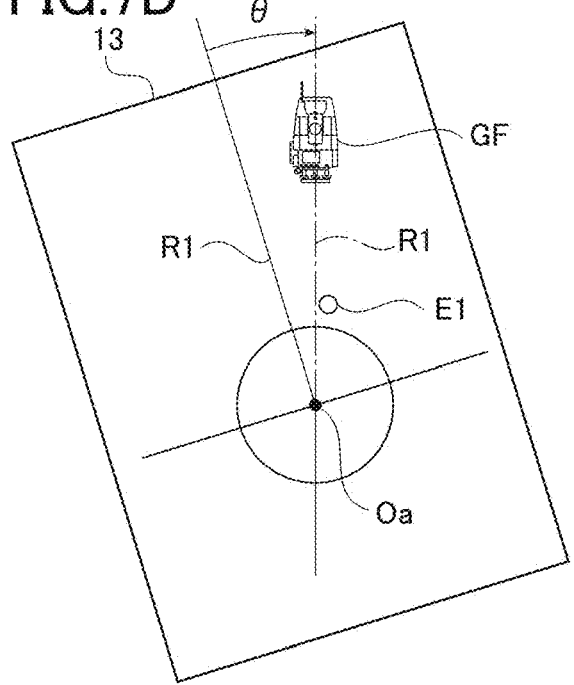
FIG. 7D is an explanation drawing illustrating a screen displayed on the display of the target device illustrated in FIG. 7B.

As illustrated in FIGS. 7C and 7D, the target position E1, a present position Oa of the target device 10, and the previously set reference line R1 are displayed on the display 13. The reference line R1 is aligned with the longitudinal direction passing through the center of the display 13, and also is aligned with a center line Ba (refer to FIG. 7B) of the fan beam B.

Figure 4:
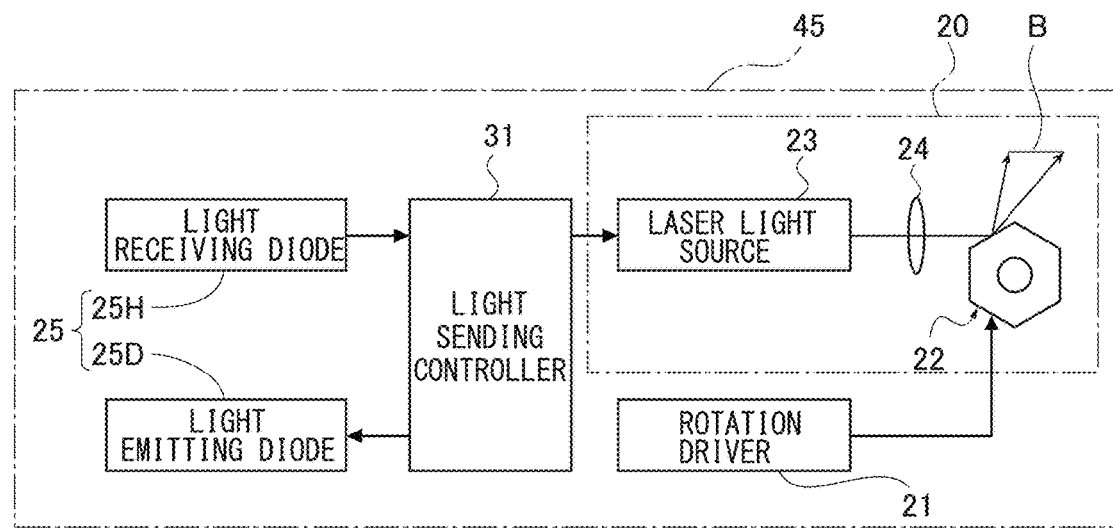
FIG. 4 is a block diagram illustrating a configuration of a control system of the fan beam output device of the target device illustrated in FIG. 2.

The fan beam output device 45 generates the fan beam B that spreads in the right and left direction, and moves the fan beam B in the up and down direction for scanning. As illustrated in FIGS. 2 and 4, the fan beam output device 45 includes the guide light sending part 20, a rotation driver 21 that rotates a polygon mirror 22, a rotation position detector 25 that detects the rotation position of the polygon mirror 22, and the light sending controller 31.

Figure 3:
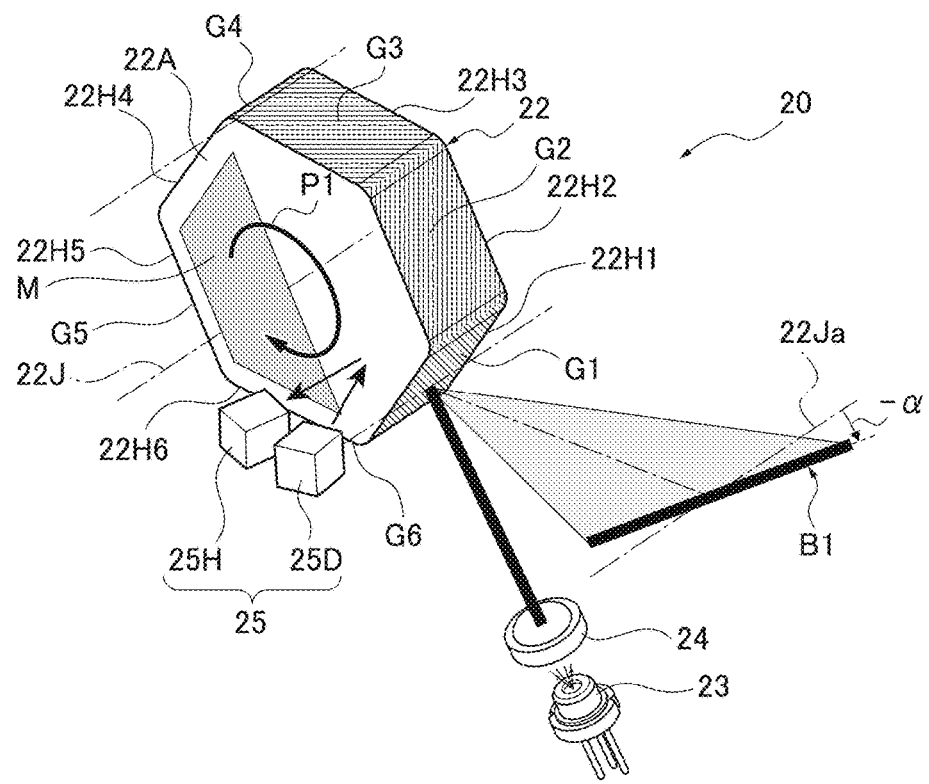
FIG. 3 is a perspective view illustrating a configuration of an optical system of a fan beam output device according to the embodiments of the present invention.

As illustrated in FIGS. 3 and 4, the guide light sending part 20 includes the polygon mirror 22, a laser light source 23 that emits laser light, and a collimator lens 24 that changes the laser light emitted from the laser light source 23 into parallel light flux to be incident on the reflection surface of the polygon mirror 22.

The polygon mirror 22 will be described below. As illustrated in FIG. 3, the polygon mirror 22 is a hexagon polygon mirror configured by providing six reflection surfaces 22H1 to 22H6 over the entire circumference of the polygon mirror 22 at equal intervals. The surfaces of the reflection surfaces 22H1 to 22H6 are provided with surface processed parts G1 to G6, respectively.

Each of the surface processed parts G1 to G6 is configured by directly applying a refractive diffraction grating on each of the reflection surfaces 22H1 to 22H6 or by attaching a not-shown sheet member having on the front surface thereof the surface processed part G1 to G6 on which the refractive diffraction grating is provided.

The surface processed part G1 of the reflection surface 22H1 reflects incident laser light, and forms the fan beam B1 as guide light that inclines at an angle of −α relative to an axis line (horizontal line) 22Ja parallel to a rotation axis 22J of the polygon mirror 22, and spreads in the right and left direction.

The surface processed part G2 forms the fan beam B2 (refer to FIG. 5) that inclines at an angle of +α in the direction opposite to the fan beam B1, and spreads in the right and left direction. The surface processed part G3 forms the fan beam B3 that inclines at the same angle−α as the fan beam B1.

The surface processed parts G4 to G6 form the fan beams B4 to B6 that spread in the right and left direction which is the same direction as the axis line 22Ja.

Each of the fan beams B1 to B6 is moved from top to bottom or from bottom to top for scanning by the rotation of the polygon mirror 22 in an arrow P1 direction (refer to FIG. 3).

As shown in FIG. 3, a mark M corresponding to the reflection surfaces 22H4 to 22H6 is put on a side surface 22A of the polygon mirror 22.

The rotation position detector 25 will be described below. The rotation position detector 25 includes a light emitting diode 25D that emits light toward the side surface 22A of the polygon mirror 22 and a light receiving diode 25H that receives reflection light reflected on the side surface 22A. The rotation position detector 25 detects the rotation position of the polygon mirror 22 by detecting the mark M put on the side surface 22A of the polygon mirror 22.

The rotation position detector 25 is configured by the light emitting diode 25D and the light receiving diode 25H. However, the configuration of the rotation position detector 25 is not limited thereto. For example, an annular slide resistor is provided in the side surface 22A of the polygon mirror 22 and a contact that relatively slides and moves on the slide resistor along with the rotation of the polygon mirror 22 is provided, so as to obtain the rotation position of the polygon mirror 22 based on a resistance value of the slide resistor according to the movement of the contact.

The light sending controller 31 controls the on/off of the laser light source 23 based on the rotation position of the polygon mirror 22, namely, the detection of the mark M by the rotation position detector 25. In this embodiment, while the mark M is not detected by the rotation position detector 25, the laser light source 23 is turned on, and while the mark M is detected by the rotation position detector 25, the laser light source 23 is turned off.

When the laser light source 23 is turned off while the mark M is detected, the fan beams B1 to B3 are only generated for scanning. On the other hand, when the laser light source 23 is turned on while the mark M is detected, the fan beams B4 to B6 are only generated for scanning.

The polygon mirror 22 is rotated at a constant speed. A desired fan beam of the fan beams B1 to B6 is therefore only generated for scanning by controlling the on/off of the laser light source 23 with reference to the mark M detected by the rotation position detector 25.

Figure 6:
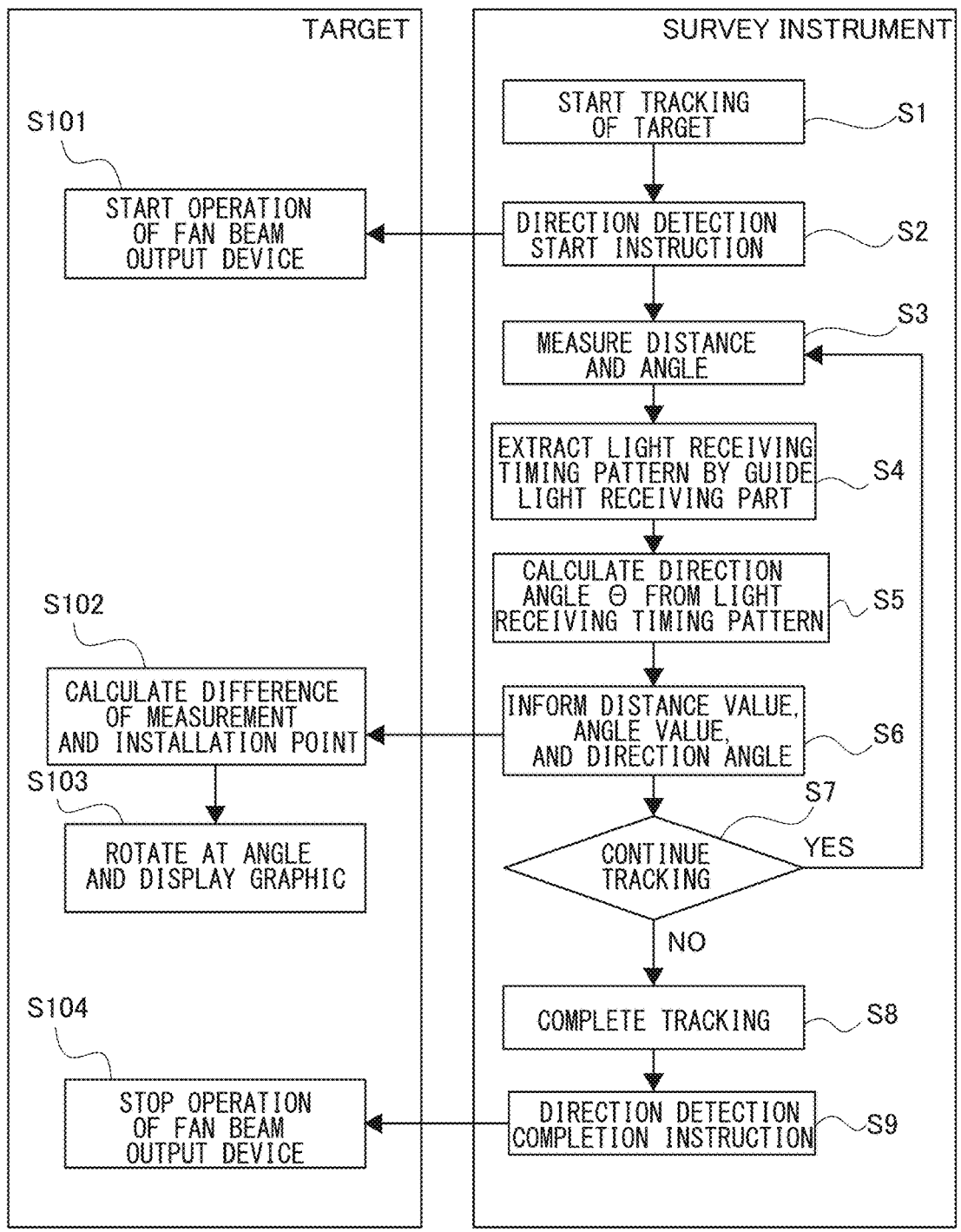
FIG. 6 is a flowchart illustrating operations of the target device and the survey instrument.

Next, the operation of the survey system 1 configured as described above will be described with referenced to the flowchart of FIG. 6.

At first, as illustrated in FIG. 1, the survey instrument 50 is installed in a predetermined position and the target device 10 is moved in a position near the target position (measurement and installation point) to start the survey system 1. The operation of the survey instrument 50 proceeds to Step 1.

In Step 1, the tracking light as approximate parallel light is emitted from the tracking light sending part 60 (refer to FIG. 2), and the telescope part 54 is vertically rotated while the main body 53 (refer to FIG. 1) is horizontally rotated. The telescope part 54 thereby scans a predetermined range to be directed in the direction in which the center of the image received by the tracking light receiving part 61, namely, the prism image is located at a predetermined position. The telescope part 54 then starts the tracking of the target 30 of the target device 10.

In Step 2, a direction detection start instruction for obtaining the angle θ of the survey instrument direction from the target 30 to the survey instrument 50 relative to the reference line R1 on the display 13 of the target device 10 is sent from the survey instrument 50 to the target device 10 through the communication part 65 (refer to FIG. 2).

When the communication part 14 of the target device 10 receives the direction detection start instruction, the process in Step 101 is started.

In Step 101, the calculation controller 40 (refer to FIG. 2) operates the fan beam output device 45, and also operates the rotation driver 21 to rotate the polygon mirror 22 at a constant speed.

On the other hand, the light sending controller 31 of the fan beam output device 45 controls the on/off of the laser light source 23 based on the rotation position of the polygon mirror 22 detected by the rotation position detector 25. More specifically, the light emitting diode 25D of the rotation position detector 25 is emitted, and the reflection light reflected on the side surface 22A of the polygon mirror 22 is received by the light-receiving diode 25H. The laser light source 23 is turned off when the amount of light received by the light-receiving diode 25H is equal to a predetermined amount or less, namely, while the mark M is detected by the rotation position detector 25. The laser light source 23 is turned on when the amount of light received by the light-receiving diode 25H is larger than the predetermined amount, namely, while the mark M is not detected by the rotation position detector 25.

Figure 5:
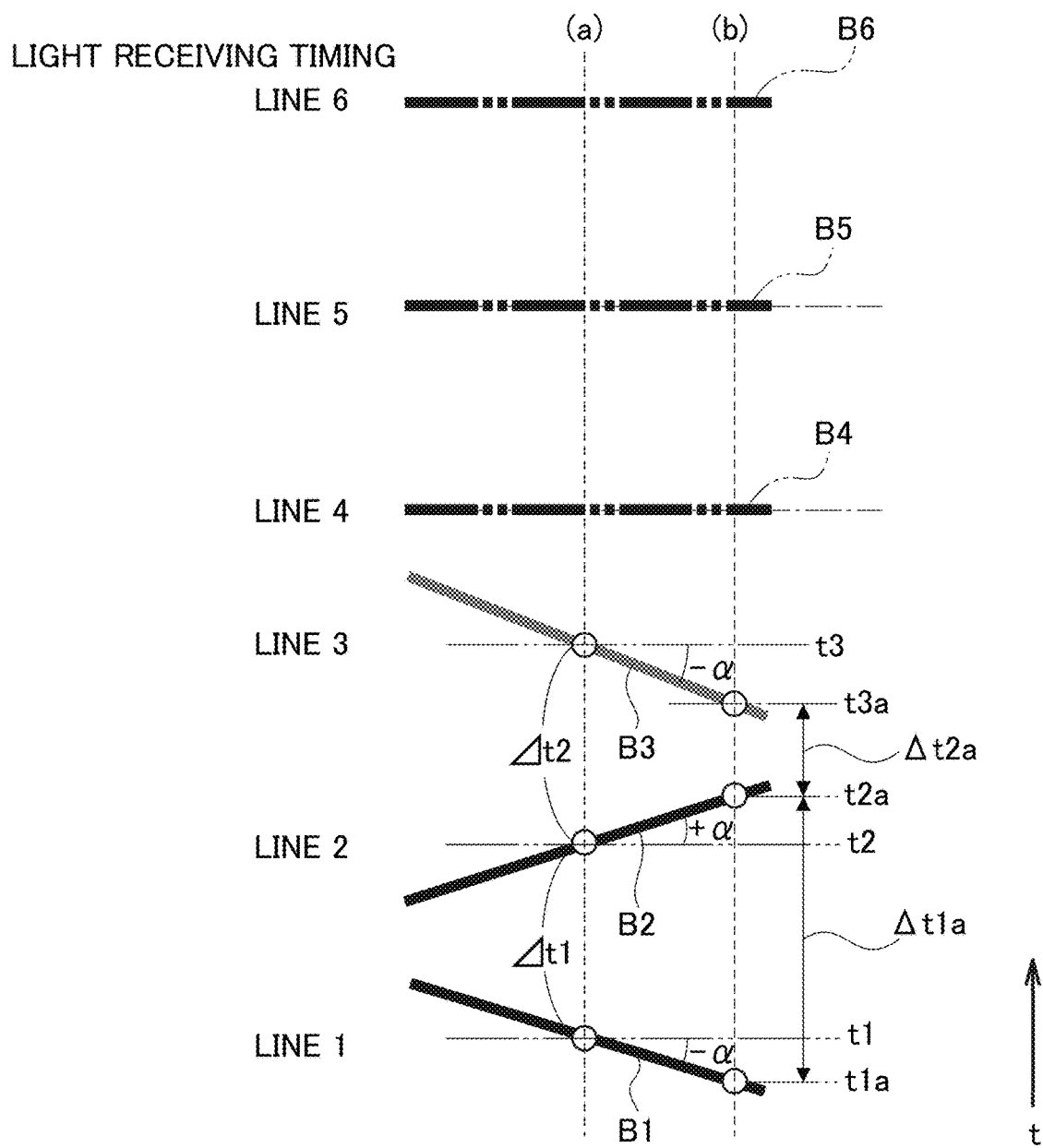
FIG. 5 is an explanation drawing illustrating inclination of fan beams emitted from the fan beam output device illustrated in FIG. 4.

The fan beams B1 to B5 illustrated in FIG. 5 are output by turning on the laser light source 23.

In Step 3, the measurement light is emitted from the distance measurement part 63 of the survey instrument 50, and the distance to the position of the target 30 of the target device 10 is measured and the angle of the direction of the target 30 relative to the horizontal reference line of the survey instrument 50 is measured (angle measurement). This angle is the horizontal rotation angle of the main body 53 detected by the horizontal angle detector 68 when the center of the prism image of the tracking light receiving part 61 is located in the predetermined position. The angle measurement is performed at least in the horizontal direction.

In Step 4, a timing pattern in which the guide light receiving part 55 (refer to FIG. 1) receives the fan beams B1 to B3 is extracted.

As illustrated in FIG. 7A, when the target device 10 faces the survey instrument 50, namely, when a direction line F1 from the guide light sending part 20 (refer to FIG. 1) of the target device 10 to the guide light receiving part 55 of the survey instrument 50 is aligned with the center line Ba of the fan beam B, the timing pattern as illustrated in (a) of FIG. 5 is obtained in which the guide light receiving part 55 receives the fan beams B1 to B3 at points t1, t2, and t3. The times between the points are Δt1 and Δt2, and Δt1 and Δt2 are the same time.

As illustrated in FIG. 7B, when the target device 10 does not faces the survey instrument 50, namely, when the center line Ba of the fan beam B is misaligned with the direction line F1 at angle θ, the timing pattern as illustrated in (b) of FIG. 5 is obtained in which the guide light receiving part 55 receives the fan beams B1 to B3 at points t1a, t2a, and t3a. The times between the points are Δt1a and Δt2a, and the Δt1a increases while the Δt2a decreases in accordance with an increase in angle θ.

The angle θ is obtained based on the ratio of the times Δt1a and Δt2a (Δt1a/Δt2a).

In Step 5, the calculation controller 70 calculates the angle (direction angle) θ based on the ratio of the above times Δt1a and Δt2a in accordance with the timing pattern.

In Step 6, the data on the distance and the angle obtained in Step 3 and the data on the angle θ calculated in Step 5 are informed to the target device 10, namely, are sent to the target device 10 through the communication part 65.

When the communication part 14 of the target device 10 receives the data on the distance and the angle and the date on the angle θ, the process in Step 102 is executed.

In Step 102, the difference between the measurement and installation point (target position) and the present position Oa of the target device 10 is calculated based on the sent data on the distance and the angle and the previously obtained positional information of the measurement and installation point. In addition, this difference may be calculated by the survey instrument 50, and the data on the difference may be sent to the target device 10.

When the target device 10 and the survey instrument 50 have the positional relationship as illustrated in FIG. 7B, the present position Oa and the target position E1 of the target device 10 are displayed on the display 13 as illustrated in FIG. 7D.

The target position E1 obtains the position of the display 13 on the coordinates based on the difference between the present position Oa and the target position E1 and the angle θ. The coordinates of the display 13 are coordinates with the reference line R1 as Y-axis, the line orthogonal to the reference line R1 as X-axis, and the present position Oa as the origin.

In Step 103, as illustrated in FIG. 7D, the reference line R1 illustrated by the solid line is displayed in the chain line position rotated at the angle θ on the display 13. The reference line R1 is rotated with the present position Oa as the center. A graphic GF showing the position of the survey instrument 50 is displayed on the reference line R1 illustrated by the chain line. This graphic GF shows the shape of the survey instrument 50.

Figure 8:
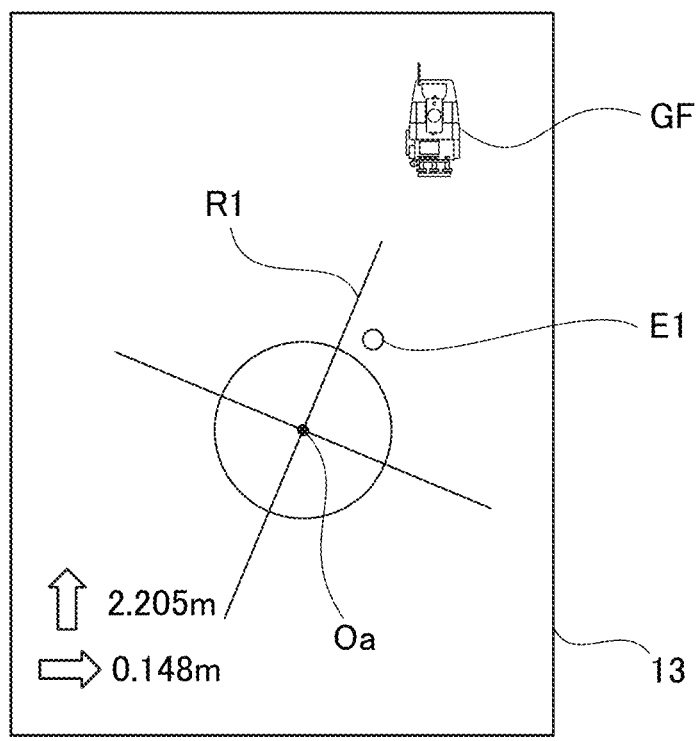
FIG. 8 is an explanation drawing illustrating a reference line displayed on the display of the target device, and the reference line being rotated at a predetermined angle.

Namely, as illustrated in FIG. 8, the present position Oa of the target device 10, the rotated reference line R1, the target position E1, the graphic GF, and the distance from the present position Oa to the target position E1 are displayed on the display 13. For example, the distance in the reference line R1 direction of 2,205 m and the distance in the direction orthogonal to the reference line R1 of 0.148 m are displayed on the display 13.

On the other hand, in Step 7, it is determined whether or not the tracking is continued. This is determined based on the presence or the absence of another target device 10. In the case of YES in Step 7, the operation returns to Step 3, and the processes in Steps 3 to 6 are repeated.

In the case of NO in Step 7, the operation proceeds to Step 8, and the tracking process is completed in Step 8.

In Step 9, a direction detection complete instruction for instructing the completion of the direction detection that obtains the angle θ is sent to the target device 10 through the communication part 65.

When the communication part 14 of the target device 10 receives the direction detection completion instruction, the process in Step 104 is executed.

In Step 104, the calculation controller 40 stops the operation of the fan beam output device 45 to stop the output of the fan beams B1 to B3.

As described above, the reference line R1 displayed on the display 13 is aligned with the direction from the present position Oa to the survey instrument 50 and also is aligned with the direction that an operator looks at the survey instrument 50, as illustrated in FIG. 8. The target position E1 of the measurement and installation point is therefore is displayed on the display 13 as actual appearance. An operator thereby recognizes the right direction of the target position E1, and reaches a destination in a short time. The operation efficiency may be thus improved.

As illustrated in FIG. 3, the polygon mirror 22 in this embodiment includes the six reflection surfaces 22H1 to 22H6. However, as the three reference surfaces 22H1 to 22H3 are actually used, a triangle polygon mirror having three reflection surfaces may be used. In this case, a wide range may be scanned with the fan beam B in the vertical direction.

In this embodiment, as illustrated in FIG. 5, the three fan beams B1 to B3 are inclined relative to the axis lines 22Ja (refer to FIG. 3). The angle θ is obtained by inclining at least one of the three fan beams B1 to B3.

The angle θ is obtained by one inclined fan beam B1, for example. In this case, the angle θ is obtained by measuring the time from the point at which no mark M is detected by the rotation position detector 25 to the point at which the fan beam B1 is received.

In the above embodiment, the surface processed parts G1 to G6 as the refractive diffraction grating are provided in the reflection surfaces 22H1 to 22H6 of the polygon mirror 22. The fan beam B is thereby formed for scanning without using a cylindrical lens as a conventional technique. The number of components of the fan beam output device 45 is therefore reduced, and it becomes unnecessary to secure the space for the cylindrical lens. The fan beam output device 45 may be downsized and light-weighted.

In this embodiment, the surface processed parts G1 to G6 as the refractive diffraction grating are provided in the reflection surfaces 22H1 to 22H6 of the polygon mirror 22.

However, the surface processed parts are not limited thereto. Surface processed parts as a lenticular lens (cylindrical lenses are closely arranged in array) may be provided in the reflection surfaces.

If the casing 12 provided with the display 13 and the guide light sending part 20 is removed from the pole 11 of the target device 10, the target 30 is guided to the target position E1 by only moving the pole 11 provided with the target 30 without largely moving the casing 12. The operation efficiency may be thus improved.

In this embodiment, the reference line R1 is set in the front and in the longitudinal direction on the display 13. However, the reference line R1 may be freely set on the display 13. For example, the reference line R1 may be set in the lateral direction and in the back direction on the display 13.

Figures 9, 10:
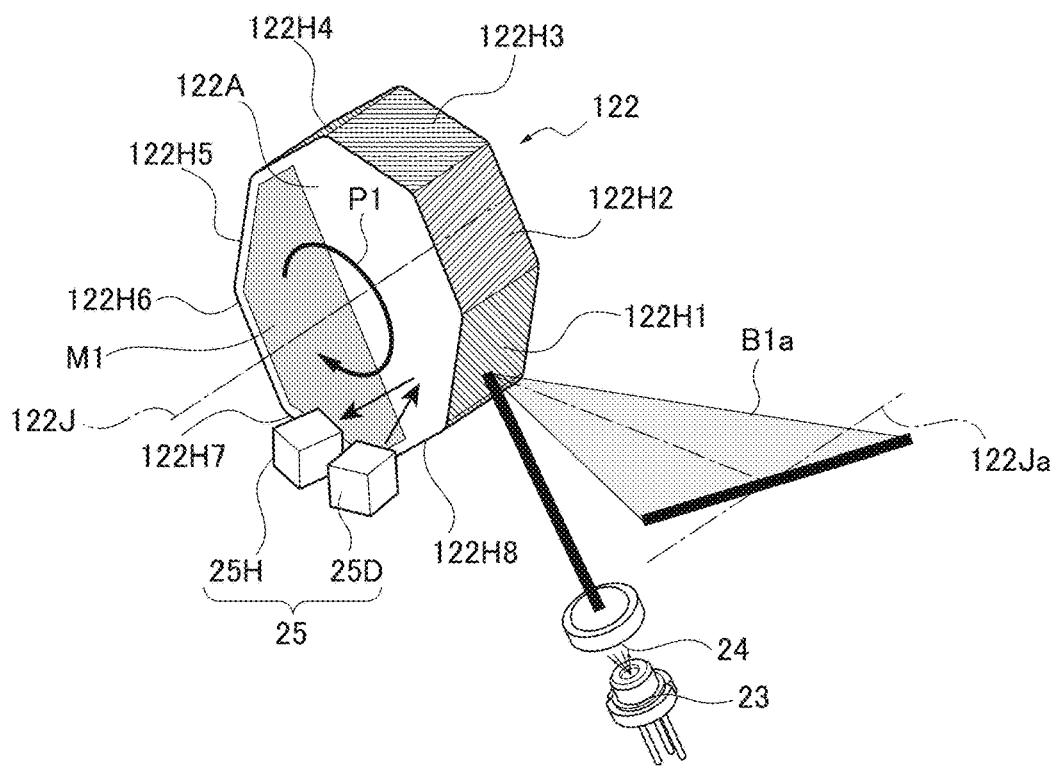
FIG. 9 is an explanation drawing illustrating an octagonal polygon mirror.
FIG. 10 is a table illustrating the combination of the inclination of the fan beams.

Another example of the polygon mirror will be described below. FIG. 9 illustrates a polygon mirror 122 having eight reflection surfaces 122H1 to 122H8. As illustrated in Table of FIG. 10, the reflection surfaces 122H1 to 122H8 are provided with surface processed parts, respectively, similar to the polygon mirror 22 illustrated in FIG. 3, to form fan beams B1a to B8a.

Each of the odd-numbered fan beams B1a, B3a, B5a, and B7a is a fan beam that spreads in the direction inclined at an angle -α relative to the axis line 122Ja parallel to the rotation axis 122J of the polygon mirror 122. Each of the even-numbered fan beams B2a, B4a, B6a, and B8a is a fan beam that spreads in the direction inclined at an angle+α relative to the axis line 122Ja parallel to the rotation axis 122J of the polygon mirror 122.

When the laser light source 23 is turned on while a mark M1 on a side surface 122A of the polygon mirror is not detected by the rotation position detector 25, the fan beams B1a to B4a are only generated for scanning, as illustrated in A1 in Table of FIG. 10.

When the fan beams B1a, B2a, B5a, and B6a are only generated for scanning as shown in A2 in table of FIG. 10 by controlling the on/off of the laser light source 23 based on the timing in which the mark M1 is detected by the rotation position detector 25 and the timing in which no mark M1 is detected by the rotation position detector 25, the output pattern of the fan beams B1a to B8a has an ID code. Similarly, when the fan beams B1a, B3a, B4a, B6a, and B7a are only generated for scanning as shown A3 in table of FIG. 10, the output pattern of the fan beams B1a to B8a has an ID code.

Figure 11:
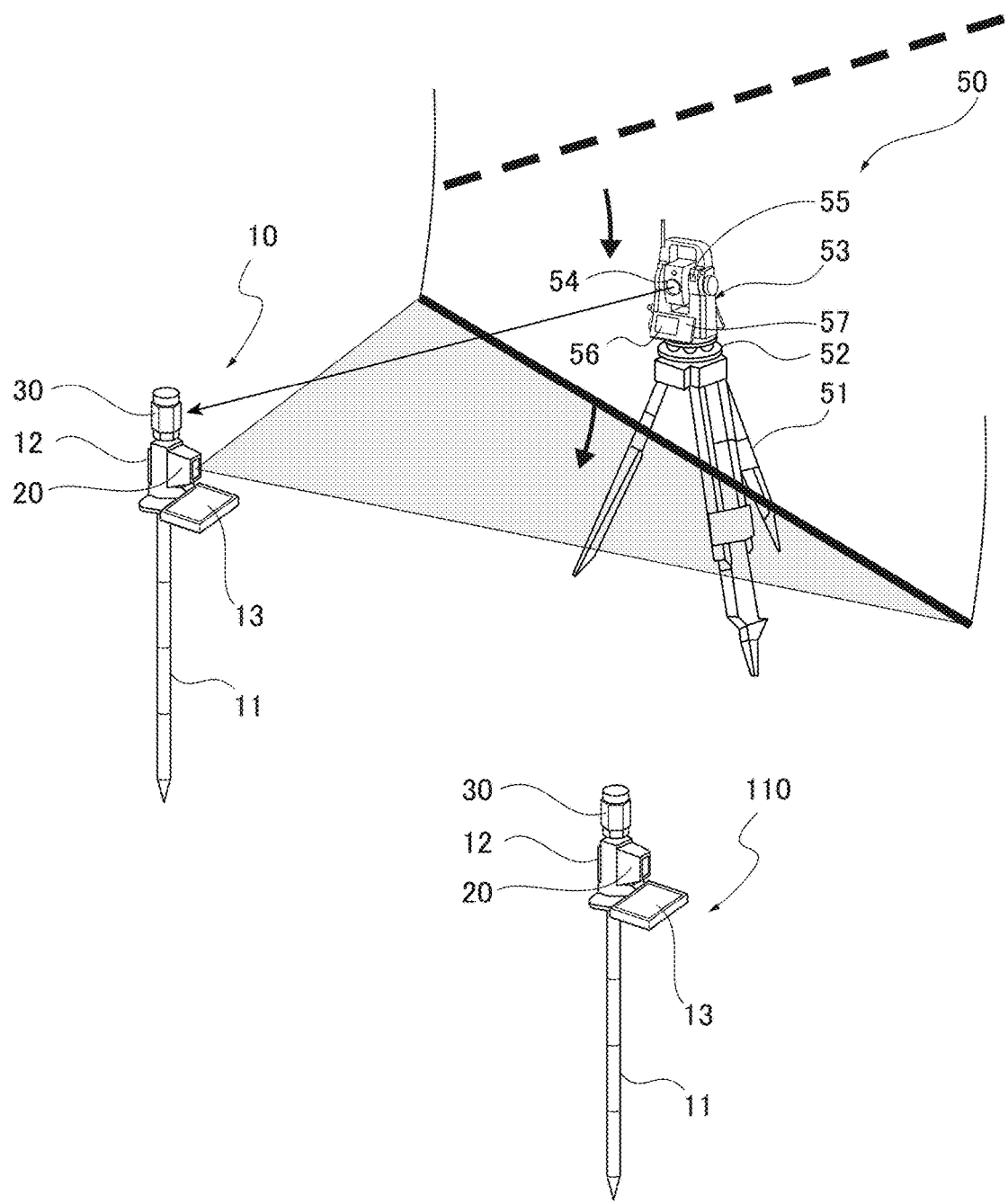
FIG. 11 is an explanation drawing illustrating a survey system using two target devices.

For example, as illustrated in FIG. 11, when two target devices 10 and 110 are used for the survey instrument 50, as shown in A1 in table of FIG. 10, the fan beams B1a to B4a are output from the target device 10, and as shown in A2 in table of FIG. 10, the fan beams B1a, B2a, B5a, and B6a are output from the target device 110. With this configuration, the fan beam B from the target device 10 and the fan beam B from the target device 10 is distinguished according to the pattern of the light receiving timing of the fan beam B of the guide light receiving part 55 of the survey instrument 50.

More specifically, when the main body 53 of the survey instrument 50 is directed to the target device 10 and 110, the survey instrument 50 distinguishes the target devices 10 and 110.

Embodiment 2

Figure 12:
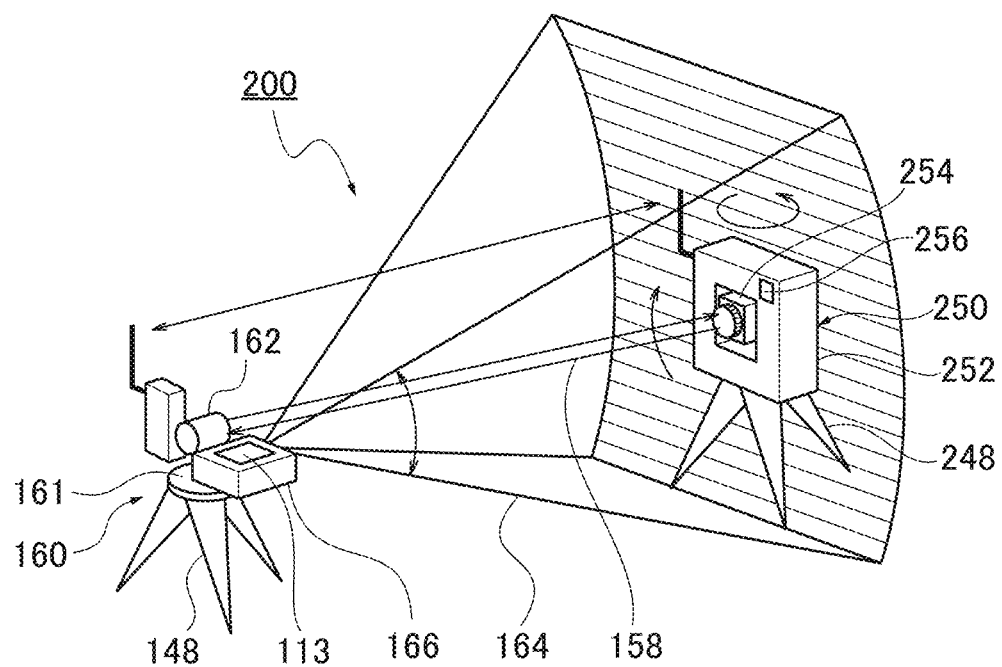
FIG. 12 is an explanation drawing illustrating a survey system according to Embodiment 2.

FIG. 12 illustrates a survey system 200 according to Embodiment 2. The survey system 200 includes a target device 160 and a survey instrument 250.

The target device 160 will be described below. The target device 160 includes a tripod 148, a leveling base 161 fixed on the tripod 148, a display 113, a target 162, and a casing 166. The target 162 and the casing 166 are attached to the leveling base 161, and the display 113 is provided on the top surface of the casing 166.

The target 162 reflects collimation light emitted from a telescope 254 of the survey instrument 250 toward the survey instrument 250.

Figure 13:
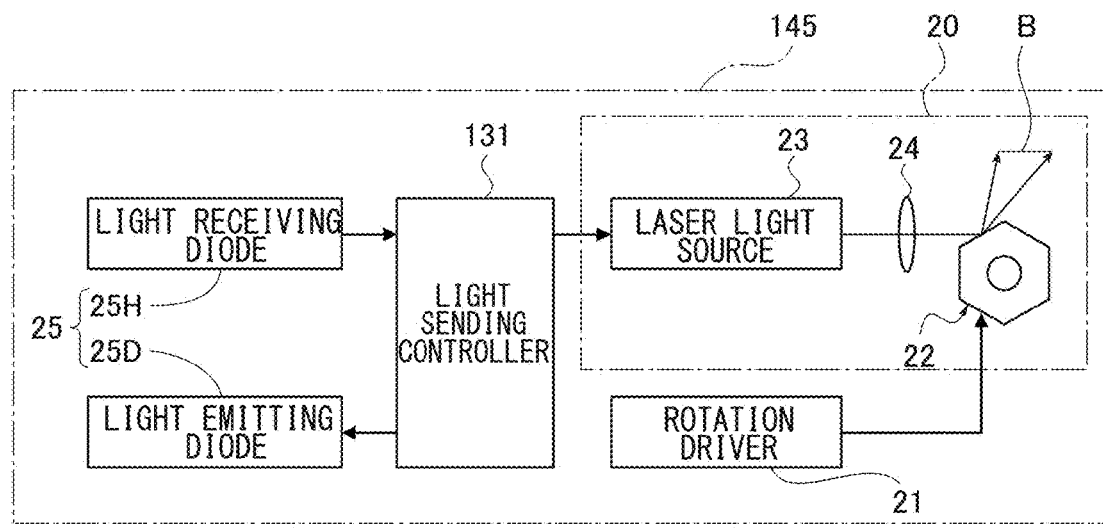
FIG. 13 is a block diagram illustrating a configuration of a fan beam output device of the survey system according to Embodiment 2.

A fan beam output device 145 is provided inside the casing 166 as shown in FIG. 13.

The fan beam output device 145 includes the guide light sending part 20, the rotation driver 21, the rotation position detector 25, and a light sending controller 131, similar to the fan beam output device 45 illustrated in FIG. 4.

The fan beam output device 145 generates the fan beams B1 to B6 illustrated in FIG. for top-to-bottom scanning.

The light sending controller 131 turns on the laser light source 23 to generate the fan beams B4 to B5 (refer to FIG. 5) while the mark M of the polygon mirror 22 (refer to FIG. 3) is detected by the rotation position detector 25 when the horizontal angle is detected in the survey instrument 50.

The light sending controller 131 turns on the laser light source 23 to generate the fan beams B1 to B3 while the mark M of the polygon mirror 22 is not detected by the rotation position detector 25 when the direction of the target device 160 relative to the survey instrument 250 is detected.

A present position Ob of the target 162, a reference line R2, and a direction line V1 indicating the direction from the target 162 to the survey instrument 250 are displayed on the display 113.

The reference line R2 is previously set. In this embodiment, the reference line R2 is set in the front direction of the target device 160, namely, in the same direction as the optical axis direction of the target 162.

The survey instrument 250 will be described next. The survey instrument 250 includes a main body 252 mounted on a not-shown leveling base fixed on a tripod 248 in a horizontally rotatable manner, and the telescope 254 provided in the main body 252 in a vertically rotatable manner.

The main body 252 includes a guide light receiving part 256 that receives the fan beam B as the guide light output from the fan beam output device 145 of the target device 160.

The main body 252 includes a not-shown calculation controller that obtains an angle β of a survey instrument direction from the target 162 to the survey instrument 250 relative to the reference line R2 (refer to FIG. 14) on the display 113 of the target device 160 based on the light receiving timing of the fan beams B1 to B3 by the guide light receiving part 256.

The survey instrument 250 includes the similar configuration as the survey instrument 50. The other configurations are the same as those described in JP2005-214854A. Thus, the detailed description thereof will be omitted.

Next, the operation of the survey system 200 will be simply described.

At first, the fan beam output device 145 of the target device 160 is operated upon the start of the survey system 200.

The fan beam output device 145 generates the fan beams B4 to B5 (refer to FIG. 5) for top-to-bottom scanning by turning on the laser light source 23 while the mark M of the polygon mirror 22 (refer to FIG. 3) is detected by the rotation position detector 25.

On the other hand, the survey instrument 250 obtains the position in the horizontal direction where the amount of fan beams B4 to B5 received by the guide light receiving part 256 becomes the maximum while horizontally rotating the main body 252. Then, the telescope 254 is directed to the position in the horizontal direction where the amount of fan beams received by the guide light receiving part 256 becomes the maximum, so as to locate the survey instrument 250 at the position in the horizontal direction, and the survey instrument 250 stops the rotation of the main body 252 after the survey instrument 250 is located at the position in the horizontal direction.

After that, the survey instrument 250 gives notice to the target device 160 through a not-shown communication part that the telescope 254 is directed to the position in the horizontal direction.

When a not-shown receiving part of the target device 160 receives the above notice, the fan beam output device 145 of the target device 160 generates the fan beams B1 to B3 (refer to FIG. 5) for top-to-bottom scanning by turning on the laser light source 23 while the mark M of the polygon mirror 22 (refer to FIG. 3) is not detected by the rotation position detector 25.

The guide light receiving part 256 of the survey instrument 250 receives the fan beams B1 to B3 by the scanning with the fan beams B1 to B3.

A not-shown calculation controller of the survey instrument 250 obtains the angle β (refer to FIG. 14) of the survey instrument 250 relative to the reference line R2 on the display 113 based on the light-receiving timing by the guide light receiving part 256. After this angle β is obtained, the survey instrument 250 sends the data on the angle β to the target device 160 through the communication part.

Figure 14:
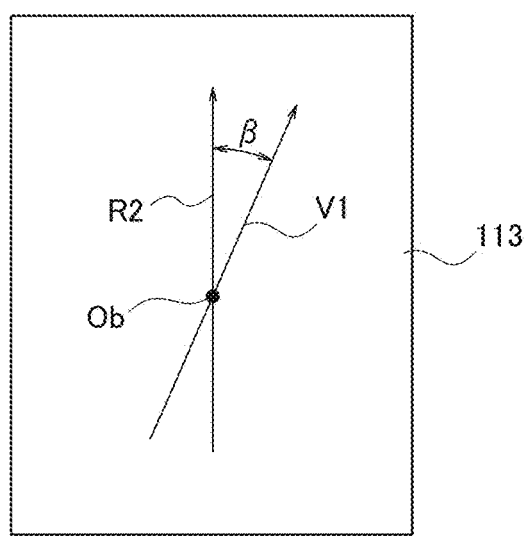
FIG. 14 is an explanation drawing illustrating a display displaying a present position of the target device, a reference line, and a direction line indicating a direction of the survey instrument.

When the communication part of the target device 160 receives the data on the angle β, the not-shown calculation controller of the target device 160 displays the direction line V1 misaligned with the reference line R2 at the angle β on the display 113, as illustrated in FIG. 14.

The target device 160 is accurately directed to the survey instrument 250 by the display of the reference line R2 and the direction line V1 on the display 113.

By redirecting the target device 160 to the survey instrument 250, the survey instrument 250 accurately measures the distance and the angle relative to the target device 160.

The data on the distance and the angle obtained by the survey instrument 250 is sent to the target device 160 through the communication part. The target device 160 displays the surveying result such as the distance value and the angle value on the display 113 based on the sent data on the distance and the angle, and completes the surveying.

The fan beams B4 to B6 for positioning the survey instrument 250 in the horizontal direction and the fan beams B1 to B3 for obtaining the direction of the survey instrument 250 are generated from one fan beam output device 145 as described above. The survey system 200 is therefore provided at lower prices.

Embodiment 3

Figure 15:
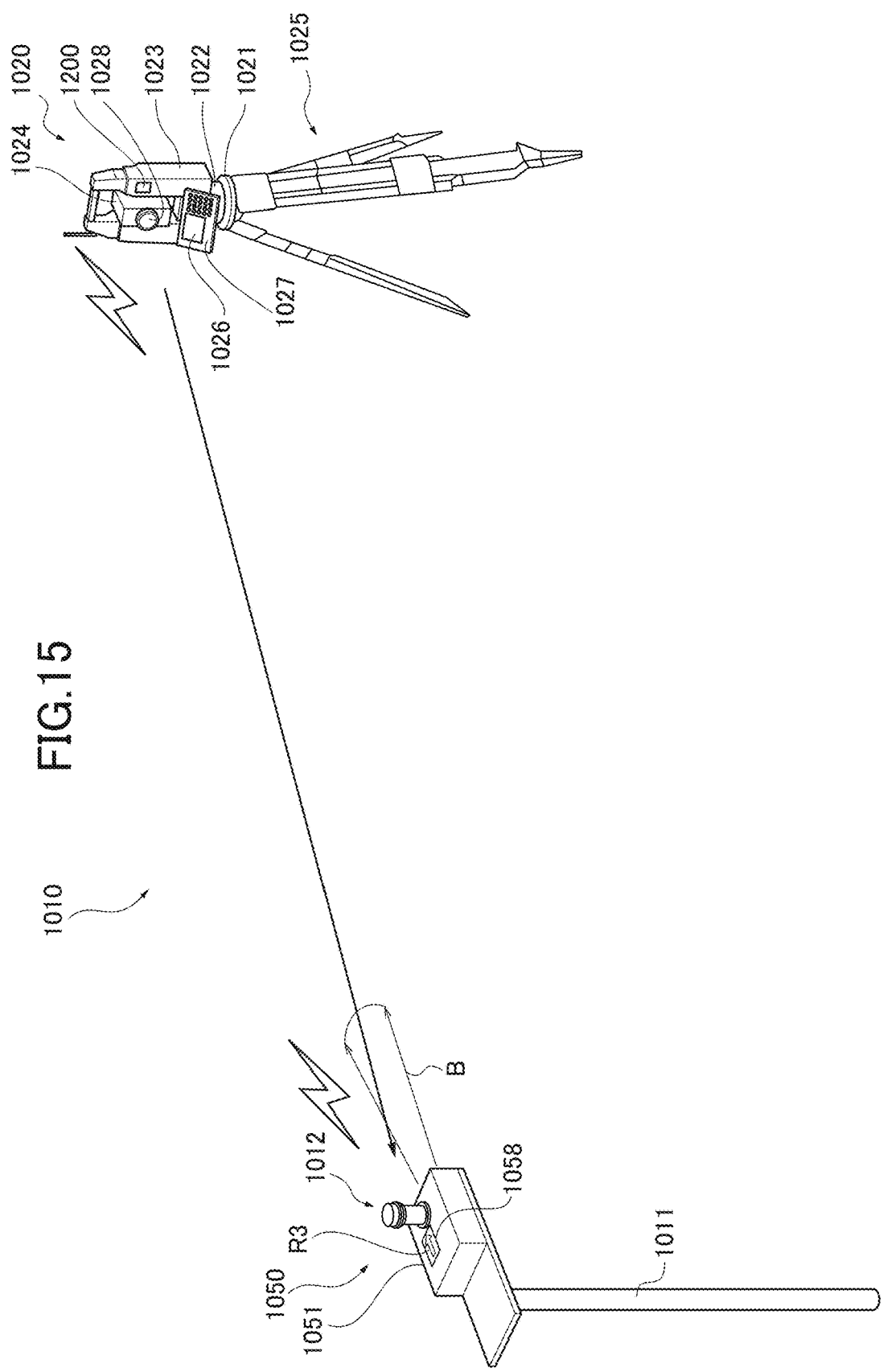
FIG. 15 is an explanation drawing illustrating a configuration of a survey system according to Embodiment 3.

FIG. 15 illustrates a survey system 1010 according to Embodiment 3. The survey system 1010 includes a survey instrument 1020 and a measurement information representing device 1050 as a target device.

The survey instrument 1020 will be described below. The survey instrument 1020 includes a leveling base 1021 fixed on a tripod 1025, a main body 1023 provided in the leveling base 1021 through a base part 1022 in a horizontally rotatable manner, and a telescope part 1024 mounted on the main body 1023 in a vertically rotatable manner. The telescope part 1024 is provided with a telescope 28.

A guide light receiving part 1200 is provided in an upper portion of the main body 1023, and a display 1026 and an operation part 1027 are provided in a front lower portion of the main body 1023.

Figure 16:
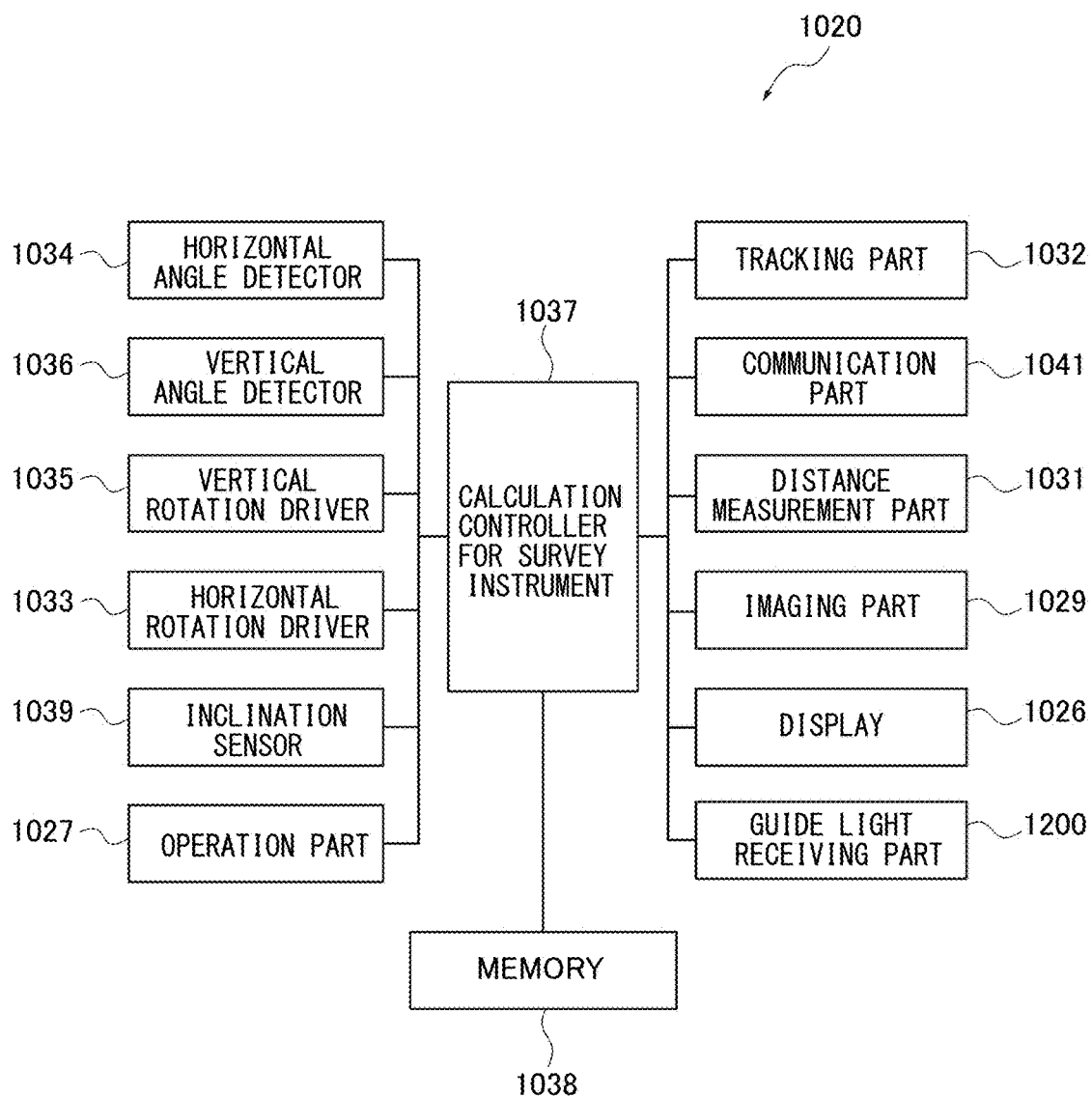
FIG. 16 is a block diagram illustrating a configuration of the survey instrument according to Embodiment 3.

As illustrated in FIG. 16, the main body 1023 includes a tracking part 1032 that automatically tracks a target 1012, a horizontal angle detector 1034 that detects a horizontal angle of the target 1012 relative to the horizontal reference line based on the light received by the tracking part 1032, a distance measurement part 1031 that emits measurement light to the target 1012 and receives the measurement light reflected by the target 1012 to obtain a distance to the target 1012, a calculation controller 1037 (calculation controller for survey instrument) that calculates the position of the target based on the distance obtained by the distance measurement part 1031 and the horizontal angle detected by the horizontal angle detector 1034, and a communication part 1041 that sends the data on the position of the target 1012 calculated by the calculation controller 1037.

The main body 1023 also includes an imaging part 1029 that images a subject in the collimation direction through the telescope 1028, a memory 1038 that stores measurement data, a horizontal rotation driver 1033 that horizontally rotates the main body 1023, a vertical rotation driver 1035 that vertically rotates (rotation about horizontal axis line) the telescope part 1024, a vertical angle detector 1036 that detects a vertical rotation of the telescope part 1024, and an inclination sensor 1039 that detects inclination of the telescope part 1024.

Figure 17:
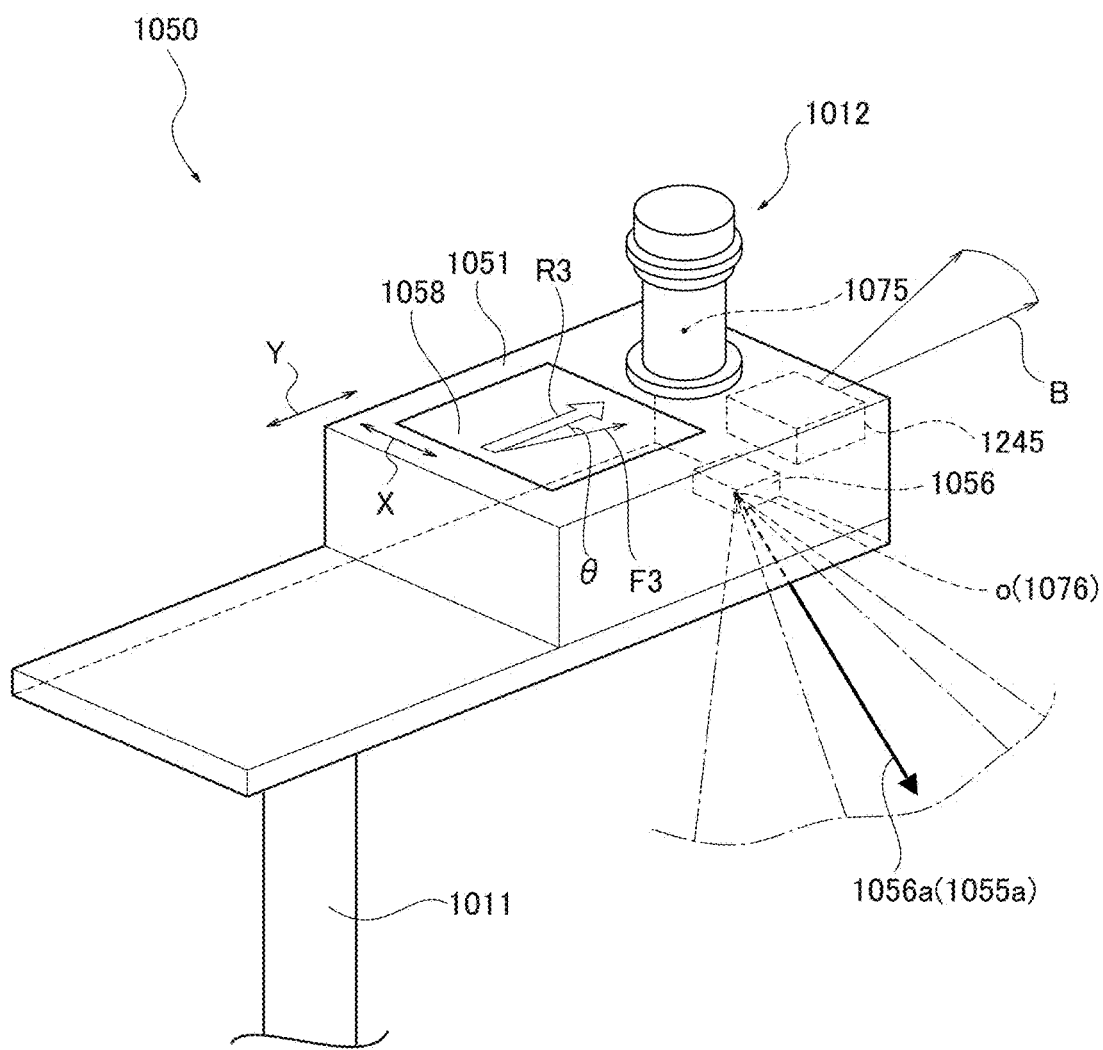
FIG. 17 is an external view illustrating a target device according to Embodiment 3.

The measurement information representing device 1050 will be described below. As illustrated in FIG. 17, the measurement information representing device 1050 includes a pole 1011, a casing 1051 attached to an upper portion of the pole 1011, the target 1012 attached to an upper portion of the casing 1051, and a display 1058 provided behind the target 1012 in a top surface of the casing 1051.

A reference line R3 indicating a previously set reference direction and a direction line F3 are displayed on the display 1058.

A projection part 1056 as a projector that projects an image showing a measurement and installation point and a fan beam output device 1245 that generates a fan beam B for scanning in the up and down direction are provided inside the casing 1051. The reference line R3 is set in the same direction as the longitudinal direction (front direction of measurement information representing device 1050: Y-axis direction) of the casing 1051.

Figure 18:
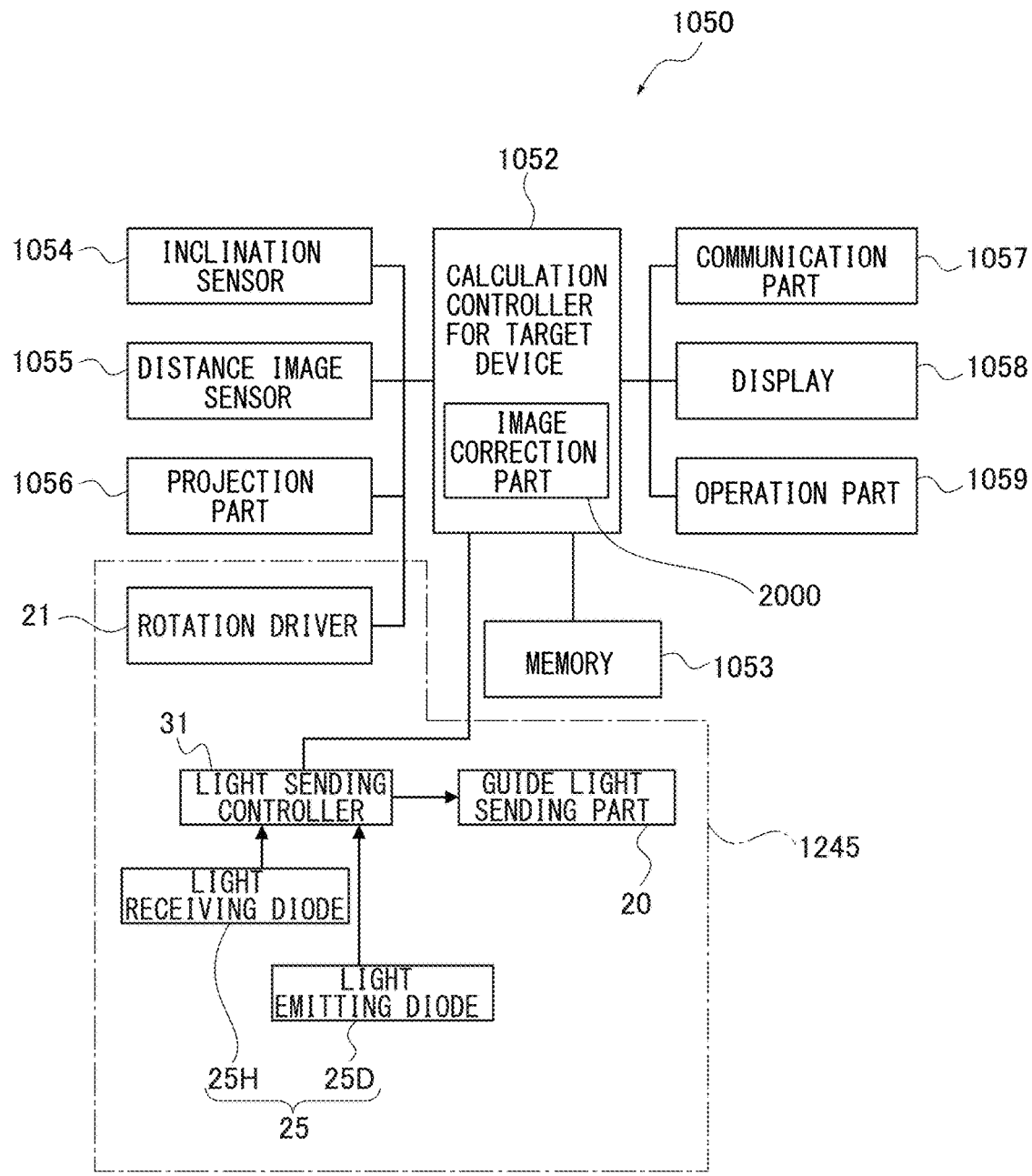
FIG. 18 is a block diagram illustrating a configuration of the target device according to Embodiment 3.

As illustrated in FIG. 18, an inclination sensor 1054 that detects inclination of the casing 1051 relative to the horizontal plane, a distance image sensor 1055, a memory 1053 that stores various data, a communication part 1057 that communicates with the survey instrument 1020, and a calculation controller (calculation controller for target device) 1052 are provided inside the casing 1051.

An operation part 1059 for executing various operations required for distance measurement is provided in the measurement information representing device 1050. In addition, the operation part 1059 is omitted in FIGS. 15 and 17.

Figure 21A:
FIGS. 21A, 21B, and 21C are explanation drawings each illustrating a specific example of the measurement image.
Figure 21B:
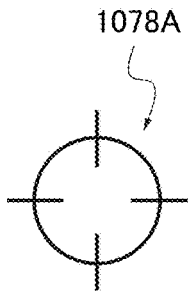
Figure 21C:
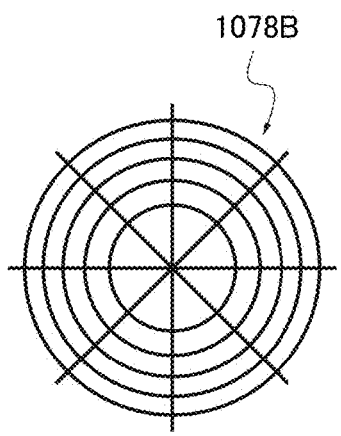

The projection part 1056 projects a target information image 1077 (refer to FIGS. 22 and 23) having any one of target position images 1078, 1078A, 1078B as illustrated in FIGS. 21A to 21C, for example, as an image showing the position of the measurement and installation point.

As illustrated in FIG. 17, a projection optical axis 1056a of the projection part 1056 inclines at a predetermined angle relative to an axis (X-axis) orthogonal to the reference line R3 on the display 1058. Namely, the projection optical axis 1056a of the projection part 1056 is provided in a plane orthogonal to Y-axis, and inclines at a predetermined angle relative to X-axis in the plane.

Figure 20:
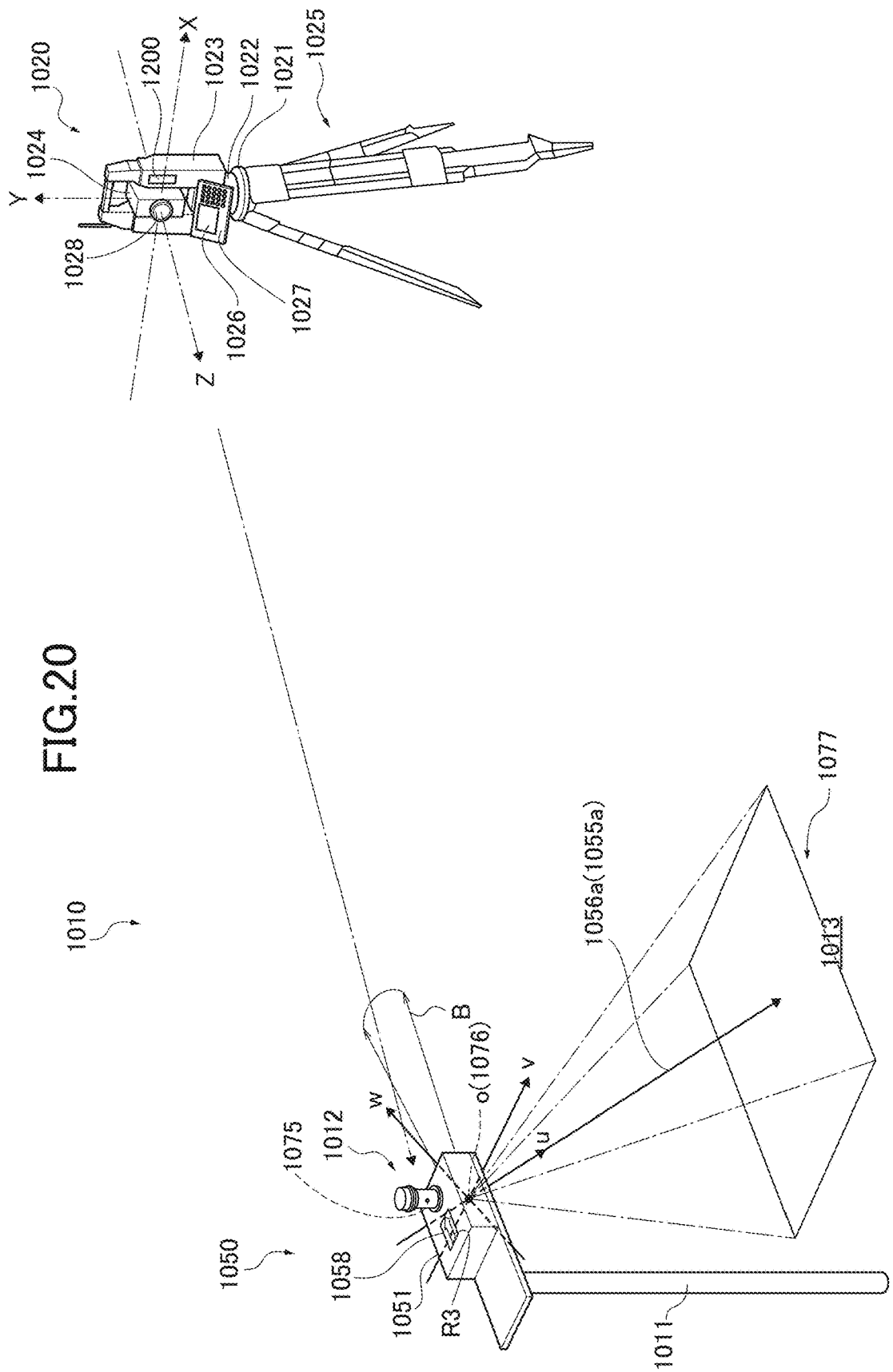
FIG. 20 is an explanation drawing illustrating a coordinate system of the target device and the survey instrument of the survey system according to Embodiment 3.

The inclination sensor 1054 (refer to FIG. 18) is a three-axis gyroscope that detects an acceleration in the three directions of u, v, and w axes (refer to FIG. 20) orthogonal to each other.

The distance image sensor 1055 obtains each part on the projection surface on which the image is projected by the projection part 1056, for example, a three-dimensional position of each part of an uneven surface on the surface of the ground. The projection surface is a surface having a predetermined range with a projection optical axis 1056a (refer to FIG. 17) as a center. In this embodiment, the projection optical axis 1056a is aligned with the detection optical axis 1055a of the distance image sensor 1055.

The distance image sensor 1055 obtains the three dimensional position of each part with a stereo method using two cameras, a lens focal point method using focus adjustment of a lens and a blurred level, a light flight time method of obtaining a distance based on a time until the return of the light projected on an object by the reflection, and a pattern light projection method of obtaining a distance based on a distortion level of a pattern in a reflection image by projecting predetermined pattern light to an object.

The calculation controller 1052 of the measurement information representing device 1050 generates a target information image 1077 (refer to FIG. 20) based on present position data of the measurement information representing device 1050 sent from the survey instrument 1020 and target coordinate information (target position: positional information of measurement and installation point) sent from the survey instrument 1020. If the projection surface is a plane, the target information image 1077 is an image in which a target position image 1078 (refer to FIG. 21A) showing a target position is projected in a target position on the plane.

Figure 19:
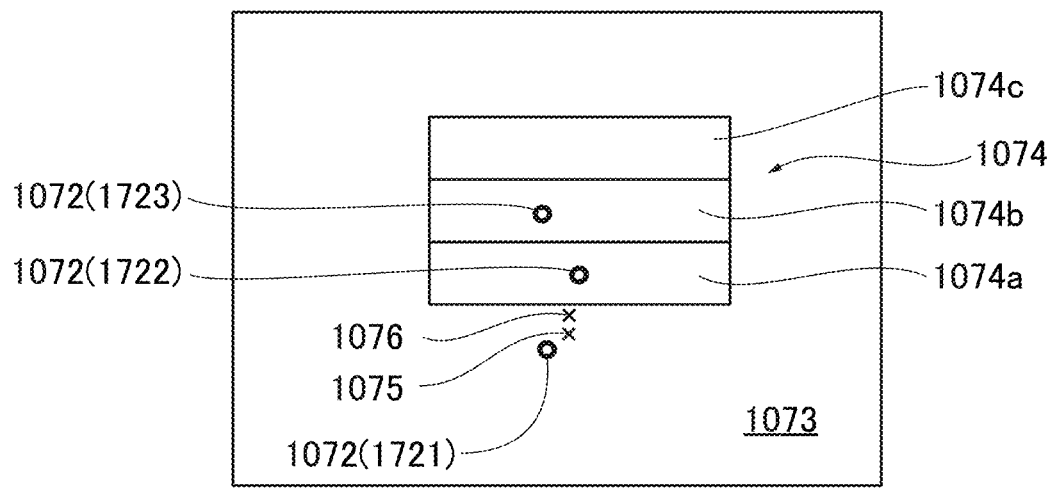
FIG. 19 is a plan view illustrating a projection condition of a measurement image showing a measurement and installation point.

The calculation controller 1052 includes an image correction part 2000 that corrects the target information image 1077, such that target position images 1078G1, 1078G2, and 1078G3 (refer to FIG. 23) are projected in the position just above the target positions 1078f, 1078a, and 1078b, namely, positions 1721 to 1723 of the measurement and installation points illustrated in FIG. 19 regardless of the unevenness of the projection surface based on the distance image information obtained by the distance image sensor 1055 and the inclination angle information obtained by the inclination sensor 1054.

The fan beam output device 1245 has the same configuration as the fan beam output device 45 illustrated in FIG. 4 of Embodiment 1. Thus, the description thereof will be omitted.

Next, the operation of the survey system 1010 configured as described above will be described whit reference the flowcharts of FIGS. 26 and 27.

At first, the operation of the measurement information representing device 1050 will be described based on the flowchart of FIG. 26.

In Step 201, the target coordinate information (positional information of each measurement and installation point) 1071 is obtained from the calculation controller 1037 (refer to FIG. 16) of the survey instrument 1020. Namely, the target coordinate information 1071 is obtained by receiving the target coordinate information 1071 sent from the communication part 1041 of the survey instrument 1020 with the communication part 1057 of the measurement information representing device 1050.

In Step 202, present coordinate information (present position of measurement information representing device 1050) 1075 (refer to FIG. 19) is obtained from the calculation controller 1037. The present coordinate information 1075 is obtained by receiving the present coordinate information 1075 sent from the communication part 1041 of the survey instrument 1020 with the communication part 1057 of the measurement information representing device 1050.

In Step 202A, the operation of the fan beam output device 1245 is started.

In Step 203, the inclination information 1061 is obtained from the inclination sensor 1054. Namely, the inclination of the casing 1051 relative to the horizontal plane is obtained.

In Step 203A, an angle θ (refer to FIG. 17) of the direction of the survey instrument 1020 relative to the reference line R3 on the display 1058 is obtained, and the direction line F3 showing the direction where the survey instrument 1020 is positioned is displayed on the display 1058. The angle θ is obtained similar to Embodiment 1.

In Step 203B, the difference between the measurement and installation point and the present position is calculated based on the target coordinate information 1071 and the present coordinate information 1075 obtained in Steps 201 and 202.

In Step 203C, the measurement information representing device 1050 is directed in the direction of the direction line F3 displayed on the display 1058 of the measurement information representing device 1050. Namely, the direction of the survey instrument 1020 is changed such that the direction line F3 is aligned with the reference line R3.

In Step 204, distance image information 1062 is obtained from the distance image sensor 1055. The distance image information 1062 is three dimensional position information of each part on the projection surface, for example, the uneven surface on the surface of the ground.

In Step 205, it is determined whether or not the target position (measurement and installation point) presents in the range of the projection plane 1013 of the projection part 1056. This is determined based on the difference obtained in Step 203B. For example, this is determined whether or not the above difference is in the distance from the center as the intersection of the projection optical axis 1056a and the surface of the ground to the border line of the projection plane 1013.

In the case of YES in Step 205, namely, when the target position (measurement point) is located within the range of the projection plane 1013 of the projection part 1056, the operation proceeds to Step 206.

In Step 206, a measurement image 1081 as the target information image 1077 (refer to FIG. 20) is generated based on the distance image information 1062 obtained in Step 204.

The measurement image 1081 will be described below.

Figure 23:
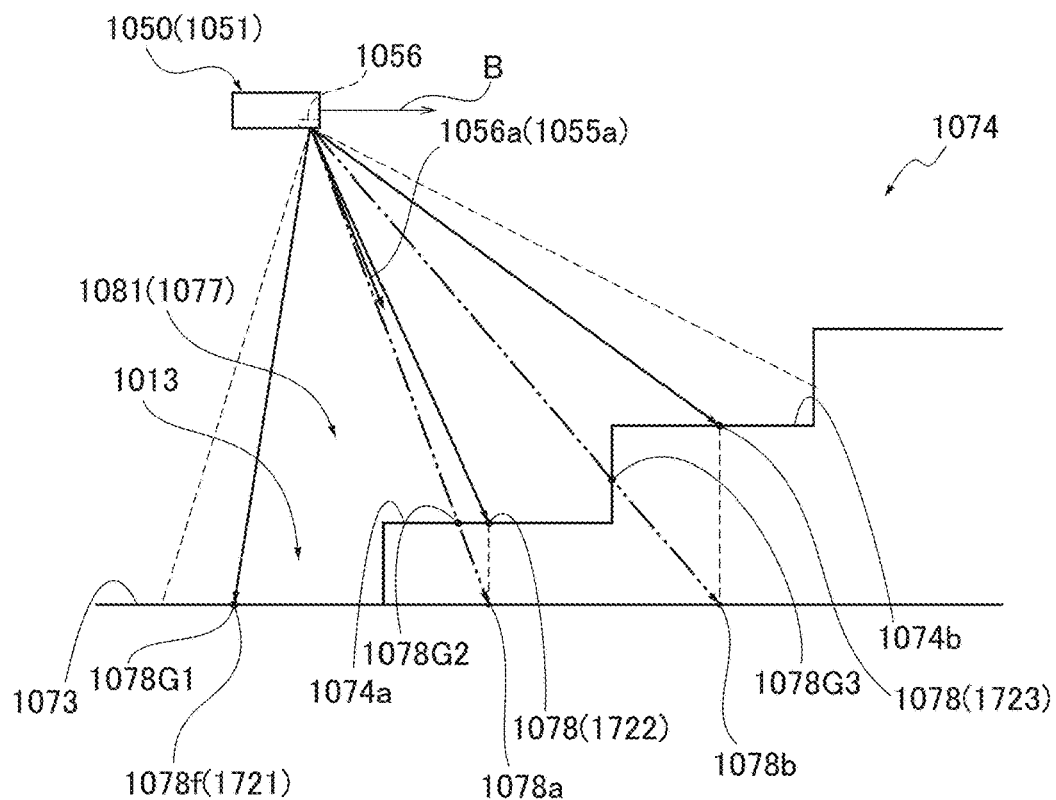
FIG. 23 is an explanation drawing illustrating a projection position of a measurement and installation point image displaced from the position of the measurement and installation point in a planer view according to a shape of a projection surface.

As illustrated in FIG. 23, when the measurement and installation points 1078f, 1078a, and 1078b are provided on the plane 1073, the calculation controller 1052 generates the measurement image 1081, such that the target position images 1078G1, 1078G2, and 1078G3 showing the measurement and installation points 1078f, 1078a, 1078b are projected on the plane 1073 based on the plane coordinate position of the measurement and installation points 1078f, 1078a, and 1078b.

The projection part 1056 projects the generated measurement image 1081 (refer to FIG. 22) on the plane 1073.

Figure 22:
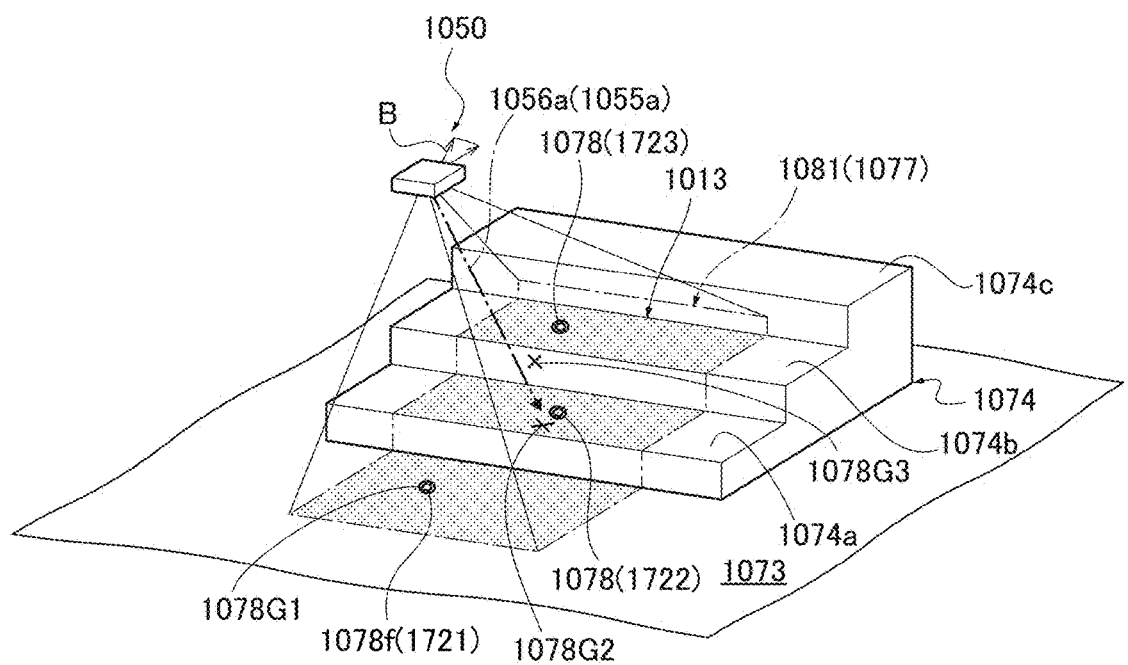
FIG. 22 is an explanation drawing illustrating the measurement image projected by a measurement information representing device.

However, when stairs 1074 are provided on the plane 1073, the projection positions of the target position images 1078G2 and 1078G3 are displaced from the positions (plane coordinate position) of the measurement and installation points 1078a and 1078b as illustrated in FIGS. 22 and 23.

In order to avoid such displacement, the target information image 1077 is corrected based on the three dimensional information of each part on the projection surface obtained by the distance image sensor 55 and the inclination angle information obtained by the inclination sensor 1054 to generate the measurement image 1081 in which the target position images 1722 and 1723 are projected in the position just above the measurement and installation points 1078a and 1078b. The measurement image 1081 is corrected through the calculation process of the image correction part 2000 of the calculation controller 1052.

The measurement image 1081 is generated through the calculation process of the calculation controller 1052 for the target device based on the three dimensional position information obtained by the distance image sensor 1055.

In the case of NO in Step 205, namely, when the target position (measurement and installation point) is not located within the range of the projection plane 1013 of the projection part 1056, the operation proceeds to Step 207.

Figure 24:
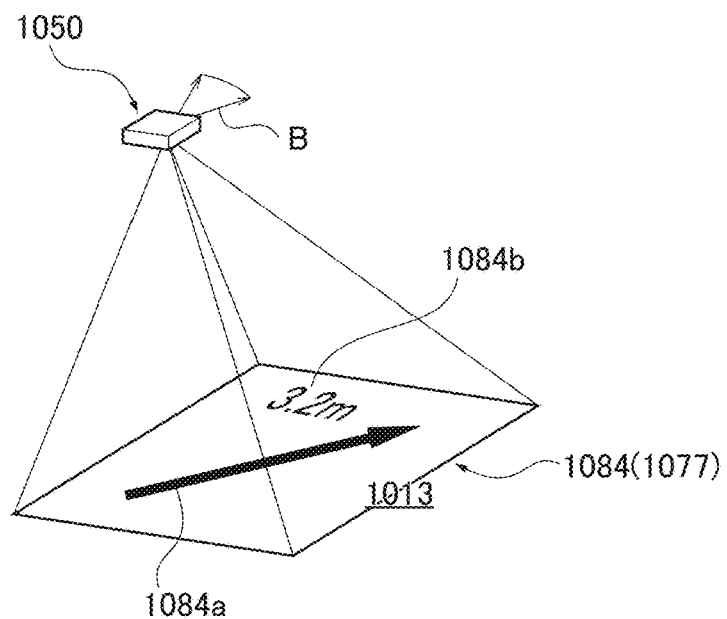
FIG. 24 is an explanation drawing illustrating a guide image.

In Step 207, as illustrated in FIG. 24, the guide image 1084 showing the direction of the target position is generated. This guide image 1084 generates an arrow image 1084a showing the target position from the position of the measurement information representing device 1050 based on the target position and the present position of the measurement information representing device 1050 obtained in Steps 201 and 202.

In Step 208, the measurement image 1081 or the guide image 1084 as the target information image 1077 generated in Step 206 or Step 207 are projected.

In Step 209, it is determined whether or not the projection of the target information image 1077 is continued. More specifically, when the measurement information representing device 1050 is not moved to the target position (measurement and installation point), or when it is necessary to move another target device to another target position, it is determined as YES. The operation then returns to Step 202, and the processes form Steps 202 to 208 are repeated.

In the case of NO in Step 209, the operation proceeds to Step 210.

In Step 210, it is determined whether or not an operation of switching the target position of the measurement information representing device 1050 to another target position is executed. In the case of YES, the operation proceeds to Step 211.

In Step 211, a target to be guided is switched to another target position, and the operation returns to Step 202. Then, the above processes are executed.

Figure 26:
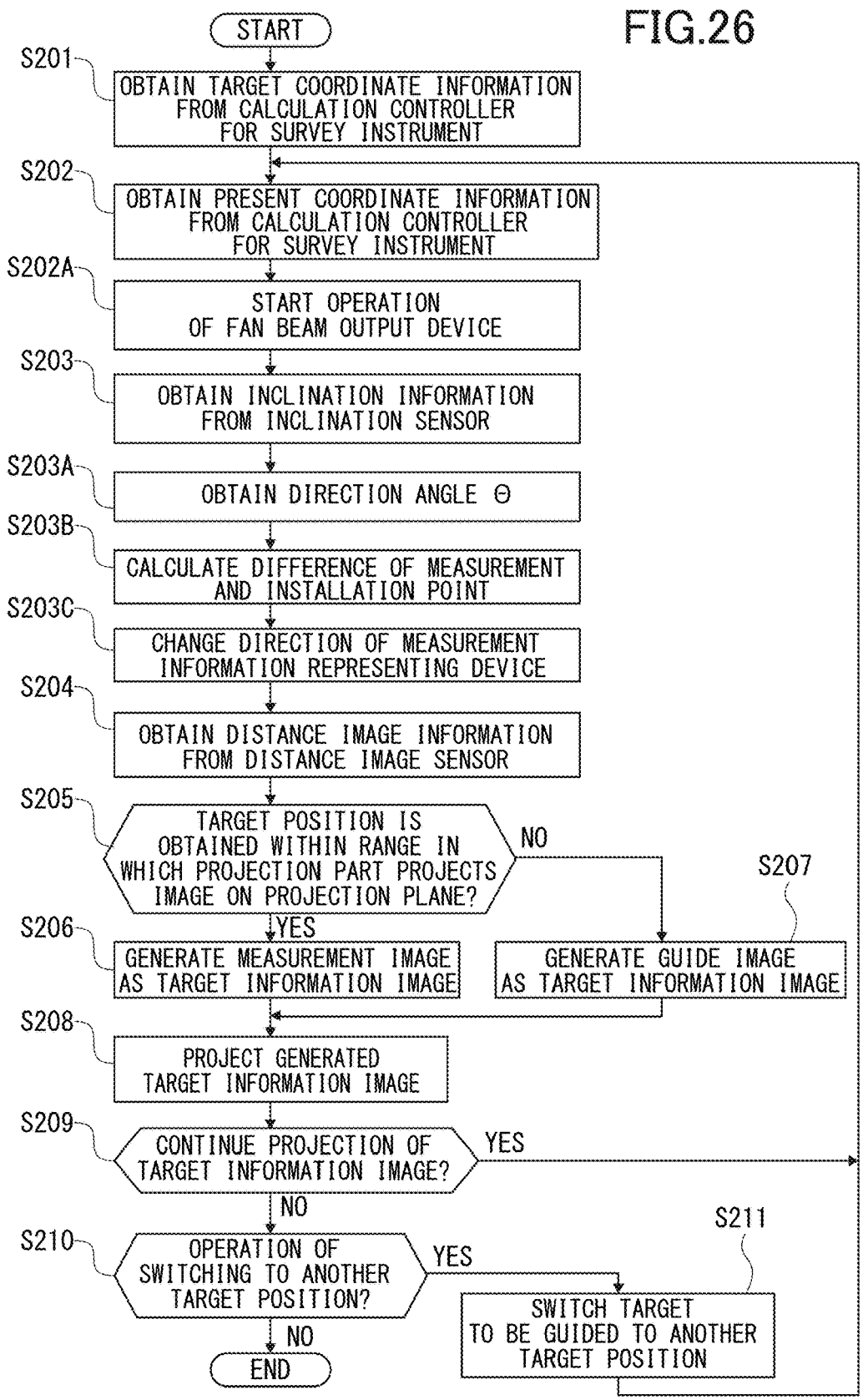
FIG. 26 is a flowchart illustrating an operation of the measurement information representing device.

In the case of NO in Step 210, the operation in the flowchart of FIG. 26 is completed.

Figure 25:
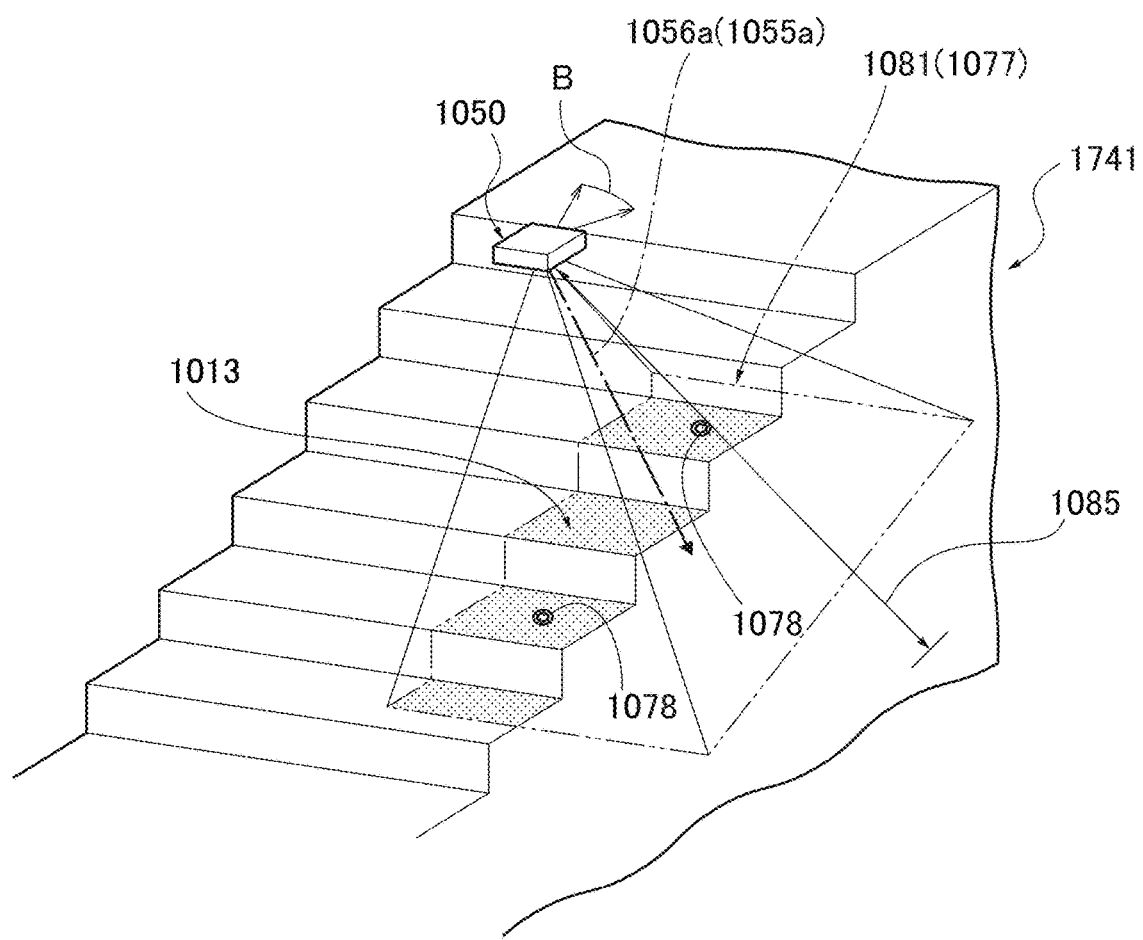
FIG. 25 is an explanation drawing illustrating a partly removed measurement image.

As illustrated in FIG. 25, when the range in which the projection part 1056 (refer to FIG. 17) is projected includes a part exceeding a projection maximum distance 1085 based on the three dimensional position of the projection plane 1013 of the stairs 1741 obtained by the distance image sensor 1055, the target information image 1077 (measurement image 1081) in which the image of that part is removed is projected.

Next, the operation of the survey instrument 1020 will be described based on the flowchart in FIG. 27.

In Step 221, the target coordinate information 1071, for example, stored in the memory 1038, or input by the operation part 1027 is sent to the measurement information representing device 1050 by the communication part 1041 (refer to FIG. 16) of the survey instrument 1020.

In Step 222, the telescope part 1024 (refer to FIG. 15) is moved in the horizontal and vertical directions to scan a predetermined range by controlling the horizontal rotation driver 1033 and the vertical rotation driver 1035 while projecting tracking light.

In Step 223, it is determined whether or not the tracking target (target 1012) is detected. In the case of NO, the operation returns to Step 222, and the processes of Steps 222, 223 are repeated until the target 1012 is detected. In the case of YES in Step 223, the operation proceeds to Step 224.

In Step 224, the tracking operation of the detected target 1012 is executed.

In Step 225, the present coordinate information 1075 as the present position information of the target 1012 is obtained.

In Step 226, the present coordinate information as the present position of the target 1012 is sent to the measurement information representing device 1050 by the communication part 1041.

In Step 227, the direction detection start instruction for obtaining the angle θ between the reference line R3 of the display 1058 of the measurement information representing device 1050 and the direction line F3 (refer to FIG. 17) showing the direction of the survey instrument 1020 is sent from the survey instrument 1020 to the measurement information representing device 1050 through the communication part 1041.

The fan beam B is thereby output from the fan beam output device 1245 of the measurement information representing device 1050 to move the fan beam for top-to-bottom scanning. In this case, the fan beams B1 to B3 shown in FIG. 5 are output for scanning.

In Step 228, the measurement light is emitted from the distance measurement part 1031 of the survey instrument 1020, the distance to the position of the measurement information representing device 1050 is thereby measured, and the angles in the horizontal and vertical directions are measured by the horizontal angle detector 1034 and the vertical angle detector 1036. In addition, as the angle θ of the direction line F3 in the horizontal direction is obtained, it is not always necessary to measure the angle in the vertical direction.

In Step 229, the guide light receiving part 1200 of the survey instrument 1020 extracts the timing pattern that receives the fan beams B1 to B5 (refer to FIG. 5).

In Step 230, the calculation controller 1037 of the survey instrument 1020 calculates the angle θ based on the extracted timing pattern.

In Step 231, the distance and the angle obtained in Step 228 and the angle θ calculated in Step 230 are sent to the measurement information representing device 1050 through the communication part 1041.

In Step 232, it is determined whether or not the measurement operation is completed.

This is determined based on the operation of the complete switch of the operation part 1027 of the survey instrument 1020. In the case of NO in Step 232, the operation returns to Step 224, and the processes in Steps 224 to 232 are repeated until the measurement operation is completed. In the case of YES in Step 232, the operation is completed.

Figure 28:
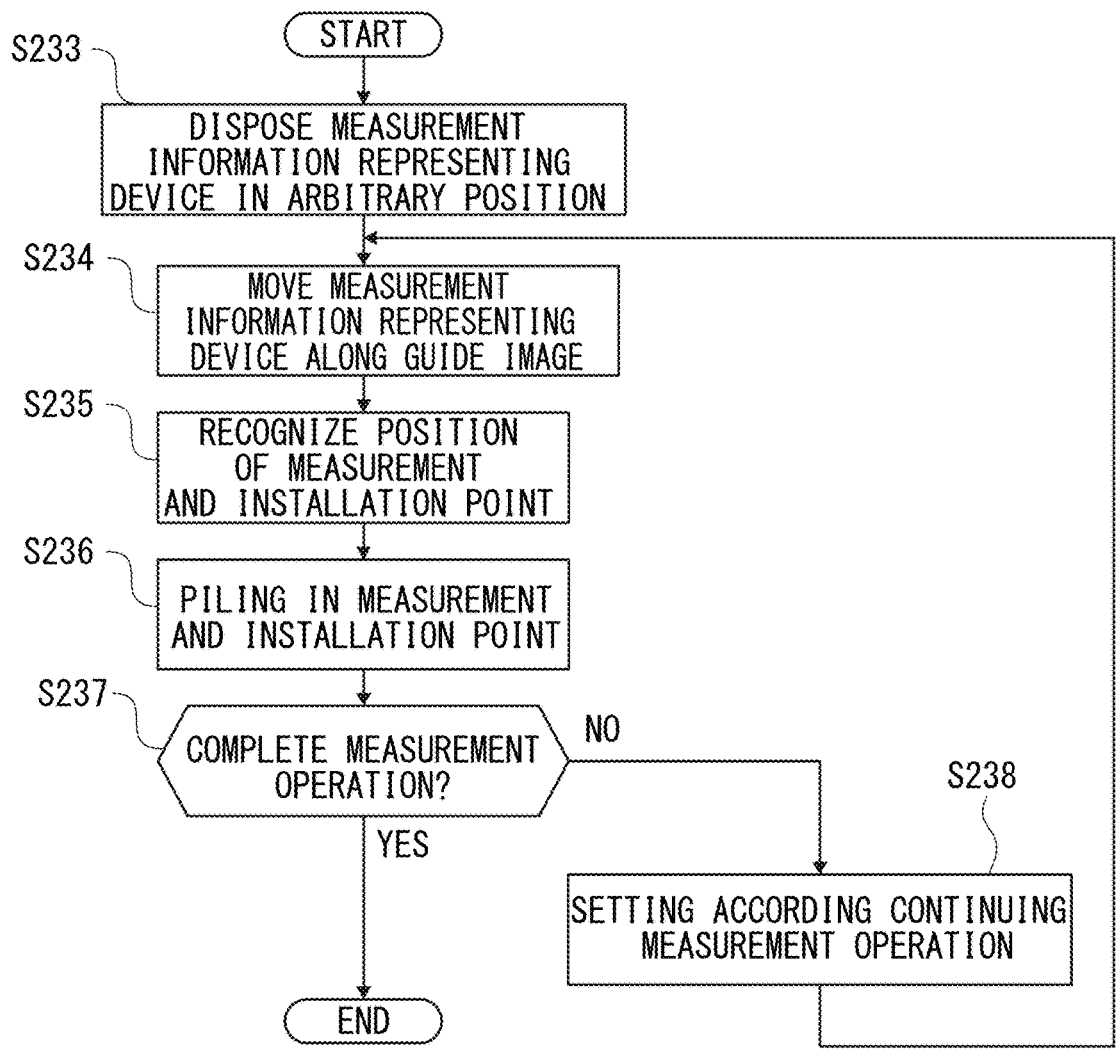
FIG. 28 is a flowchart illustrating a measurement operation.

Next, the measurement operation using the survey system 1010 will be described based on the flowchart of FIG. 28.

In Step 233, the measurement information representing device 1050 is disposed in an arbitrary position, and the reference line R3 on the display 1058 of the measurement information representing device 1050 is directed to the survey instrument 1020. On the other hand, the survey instrument 1020 sends the target coordinate information 1071 (refer to Step 221 in FIG. 27) to the measurement information representing device 1050, and the measurement information representing device 1050 obtains the target coordinate information 1071.

Figure 27:
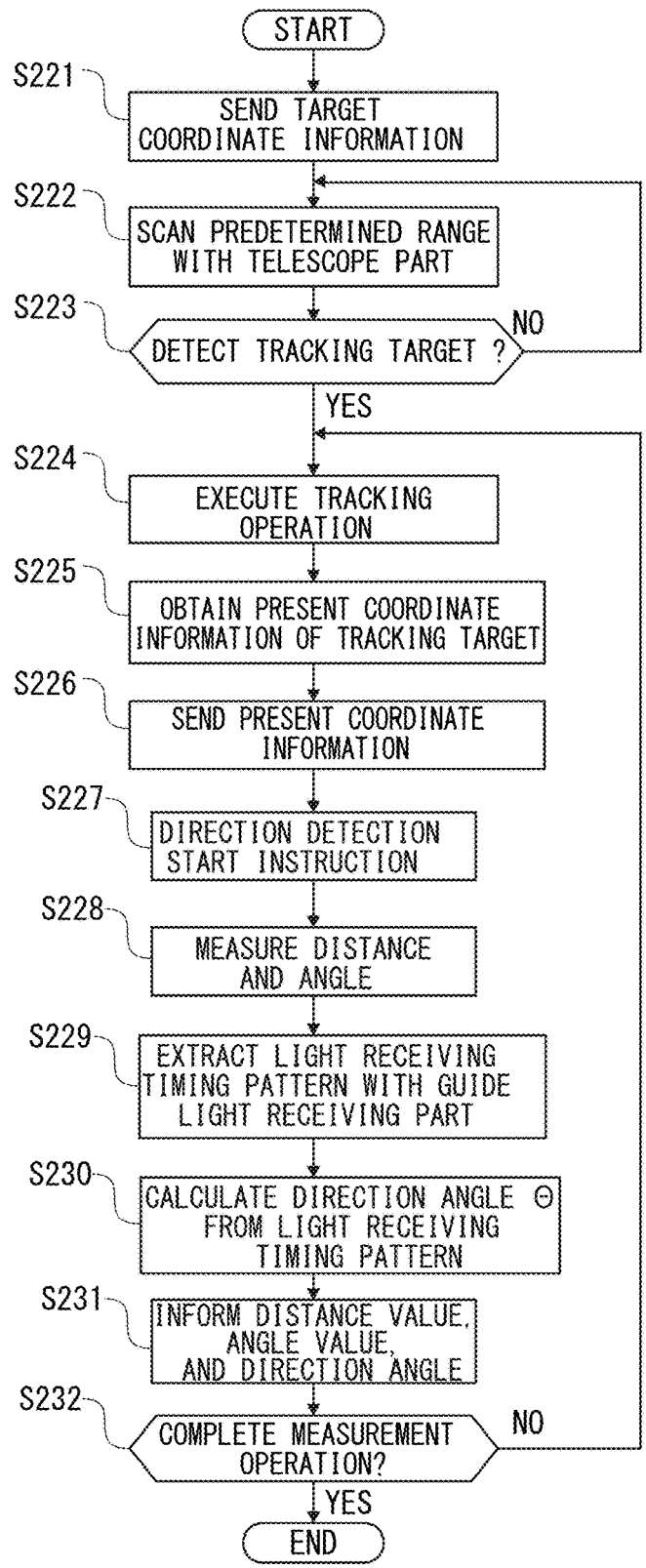
FIG. 27 is a flowchart illustrating an operation of the survey instrument.

The survey instrument 1020 detects the target 1012 of the measurement information representing device 1050 through the repetition of the processes in Steps 222 and 223 in FIG. 27. After that, the survey instrument 1020 tracks the target 1012 to obtain the present coordinate information 1075 of the target 1012, and sends the present coordinate information 1075 to the measurement information representing device 1050 (refer to Steps 224 to 226).

The measurement information representing device 1050 obtains the present coordinate information 1075. The processes in Steps 203 to 209 in FIG. 26 are executed. The guide image 1084 (refer to FIG. 24) that guides to the measurement and installation point 1072 is projected from the projection part 1056.

In Step 234, the measurement information representing device 1050 is moved in the direction indicated by the arrow image 1084a of the guide image 1084. During the movement, in the survey instrument 1020, the target 1012 is repeatedly tracked and the present coordinate information is repeatedly obtained through the repetition of the processes in Steps 224 to 232 in FIG. 27.

The measurement information representing device 1050 updates the guide image 1084 that guides the measurement and installation point 1072 to be projected from the projection part 1056 in accordance with the movement position of the measurement information representing device 1050 through the repetition of the processes in Steps 203 to 209 in FIG. 26. The measurement information representing device 1050 is therefore moved to the position where the measurement and installation point 1072 (refer to FIG. 19) is obtained within the range of the projection plane 1013 (refer to FIG. 20) of the projection part 1056.

In Step 235, an operator recognizes the position of the measurement and installation point 1072 as the measurement and installation point 1072 is obtained within the range of the projection plane 1013 of the projection part 1056.

In Step 236, a pile 1086 is driven in the position of the measurement and installation point image (target position image) 1078 showing the measurement and installation point 1072 (refer to FIG. 19) in the measurement image 1081 illustrated in FIG. 22.

In Step 237, it is determined that whether or not the piling of the measurement and installation point 1072 is completed. This is determined based on the operation of the complete switch of the operation part 1059 of the measurement information representing device 1050.

The operation proceeds to Step 237 when the pile 1086 is driven in another measurement and installation point 1072 or when it is confirmed whether or not the piling position is a right position.

In Step 238, setting according to the continuing measurement operation is performed. This setting is performed with a key operation or a touch operation of a not-shown touch panel of the operation part 1059 of the measurement information representing device 1050.

According to the survey system 1010, when a distance between the position of the measurement information representing device 1050 and the measurement and installation point 1072 as the target position is long, as illustrated in FIG. 24, the guide image 1084 having the arrow image 1084*a* indicating the direction of the measurement and installation point 1072 is projected, and the measurement information representing device 1050 is thereby smoothly directed in the direction of the measurement and installation point 1072. When the measurement information representing device 1050 comes close to the measurement and installation point 1072, the measurement and installation point image 1078 showing the position of the measurement and installation point 1072 is projected on the measurement and installation point 1072. The pile 1086 is thereby appropriately driven in the position of the measurement and installation point 1072, and the piling operation efficiency is therefore improved.

Next, an operation of confirming an appropriate piling operation will be described.

Figure 29:
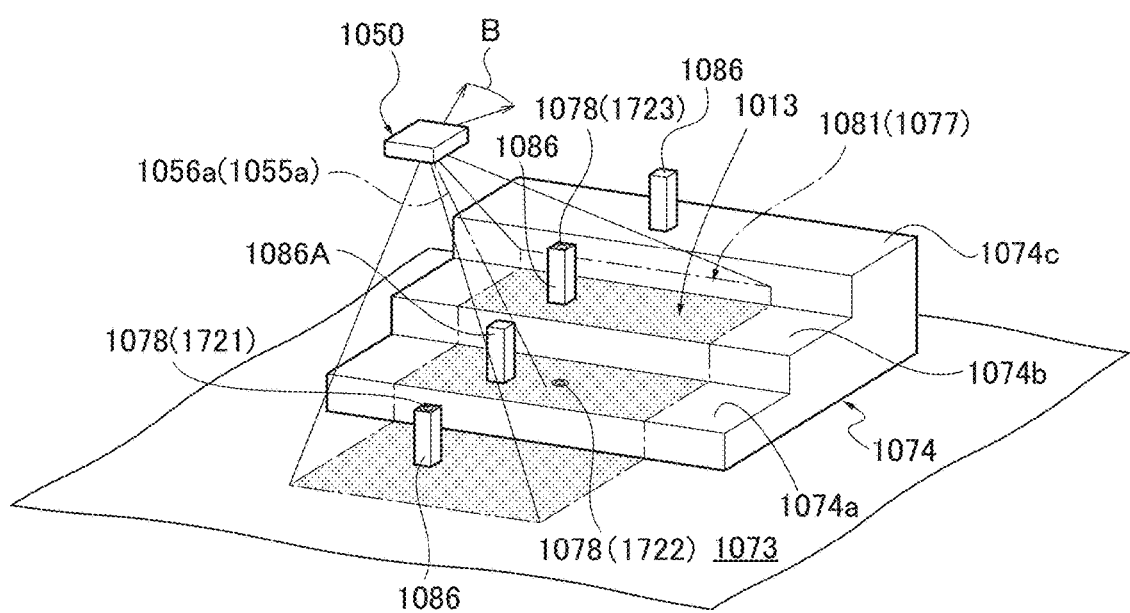
FIG. 29 is an explanation drawing for confirming whether or not piling is appropriately performed.

Upon the completion of the piling, the measurement information representing device 1050 is moved near the pile 1086 to be confirmed. After that, the processes in Steps 203 to S209 are executed. By these processes, as illustrated in FIG. 29, the projection part 1056 (refer to FIG. 17) of the measurement information representing device 1050 projects the measurement image 1081 as the target information image 1077.

The image correction part 2000 of the calculation controller 1052 corrects the measurement image 1081 (measurement image projected on the plane 1073), such that the measurement and installation point images (target position images) 1722 and 1723 are projected in the positions just above the measurement and installation points 1078*a* and 1078*b* as illustrated in FIG. 23 based on the inclination angle information obtained by the inclination sensor 1054 and the distance image information of the projection surface obtained by the distance image sensor 1055. The measurement and installation point images 1721 and 1723 are therefore projected on the top surface of the correctly driven pile 1086. The measurement and installation point image 1722 is not projected on the top surface of a pile 1086A driven in the position displaced from the position of the measurement and installation point 1078*a* (refer to FIG. 23), and is projected on a top surface 1074*a* of the first step of the stairs 1074.

Accordingly, it is confirmed whether or not the pile 1086 is appropriately driven.

EXAMPLE 1

Figure 30:
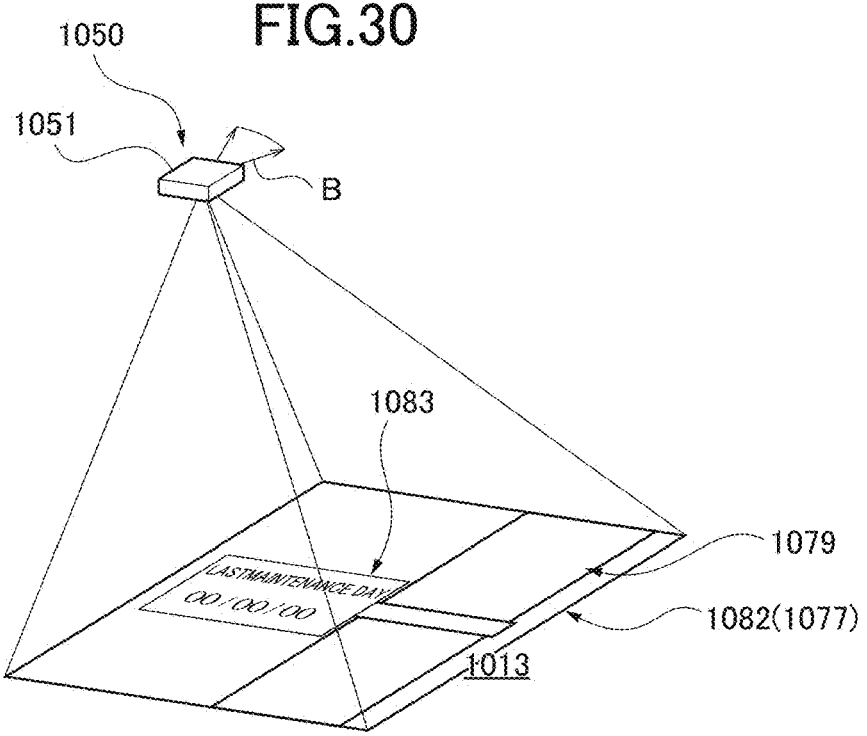
FIG. 30 is an explanation drawing illustrating a structure image projected on a floor.

FIG. 30 shows an example in which a target representing image 1079 showing the shape and the position of piping (structure) provided under a floor is projected on a floor surface by the measurement information representing device 1050.

The measurement information representing device 1050 previously stores the data of the position and the shape of the piping provided under the floor. The calculation controller 1052 generates a structure image 1082 showing the position and the shape of the not-shown piping provided just under the projection plane 1013 based on the data and the position of the projection plane 1013 on the floor surface of the projection part 1056 (refer to FIG. 8), and the structure image 1082 is projected from the projection part 1056 (refer to FIG. 18).

The measurement information representing device 1050 is directed in the direction of the survey instrument 1020 by executing the processes in Steps 202A to 203C in FIG. 26 according to Embodiment 3.

The position of the projection plane 1013 is obtained based on the position of the measurement information representing device 1050 relative to the position of the survey instrument 1020 (refer to FIG. 2) and the angle of the projection optical axis of the projection part 1056.

The structure image 1082 includes the target representing image 1079 showing the shape of the piping and the structure information image 1083 showing the final day of the maintenance of the piping. The target representing image 1079 is projected just above the piping.

The target representing image 1079 deforms when it is projected in the oblique direction. In order to avoid such deformation, the target representing image 1079 is corrected by the image correction part 2000 according to the inclination angle of the projection optical axis and the projection distance.

According to this example, as the position and shape of the piping provided under the floor are obtained, the construction and the maintenance is simplified.

EXAMPLE 2

Figure 31:
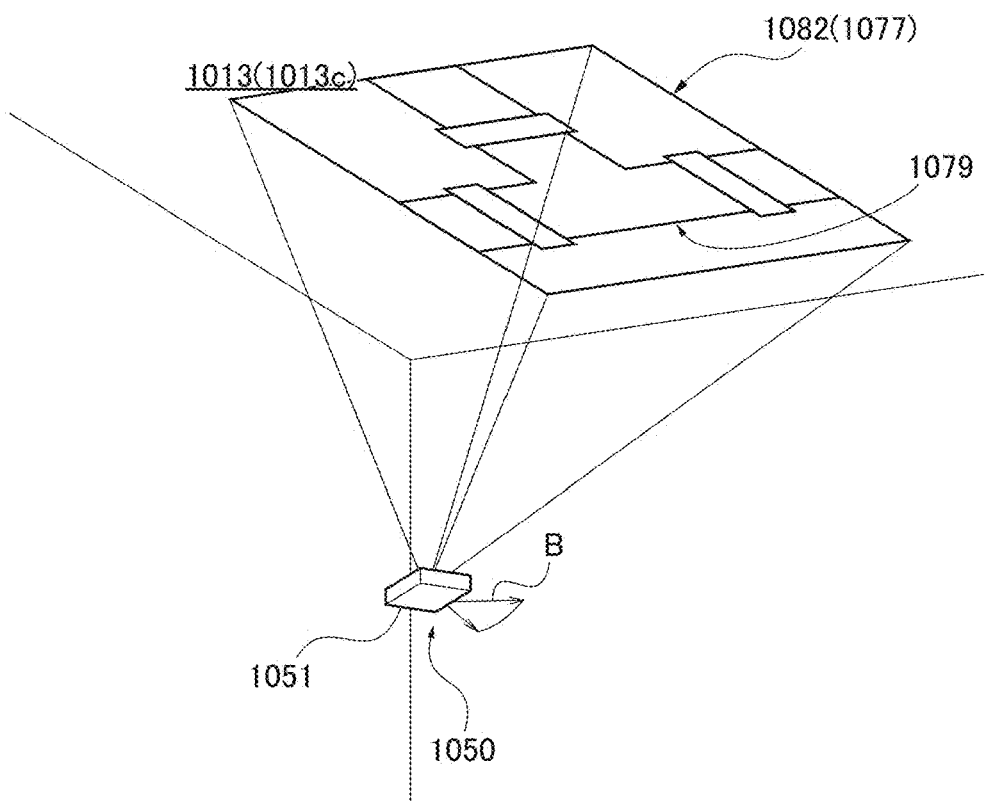
FIG. 31 is an explanation drawing illustrating a structure image projected on a ceiling.

FIG. 31 illustrates an example in that the target representing image 1079 showing the shape and the position of the piping (structure) provided above a ceiling is projected on a ceiling surface by the measurement information representing device 1050.

The casing 1051 is turned over to provide the measurement information representing device 1050 illustrated in FIG. 31. In this case, the display 1058 and the target 1012 are provided in a rear surface as the top surface.

The measurement information representing device 1050 previously stores the data on the shape and the position of the piping provided above the ceiling. The other configurations are the same as those in Example 1. The description thereof is thus omitted. In this example, the shape and the position of the piping provided above the ceiling are obtained. The construction and the maintenance are therefore simplified.

EXAMPLE 3

Figure 32:
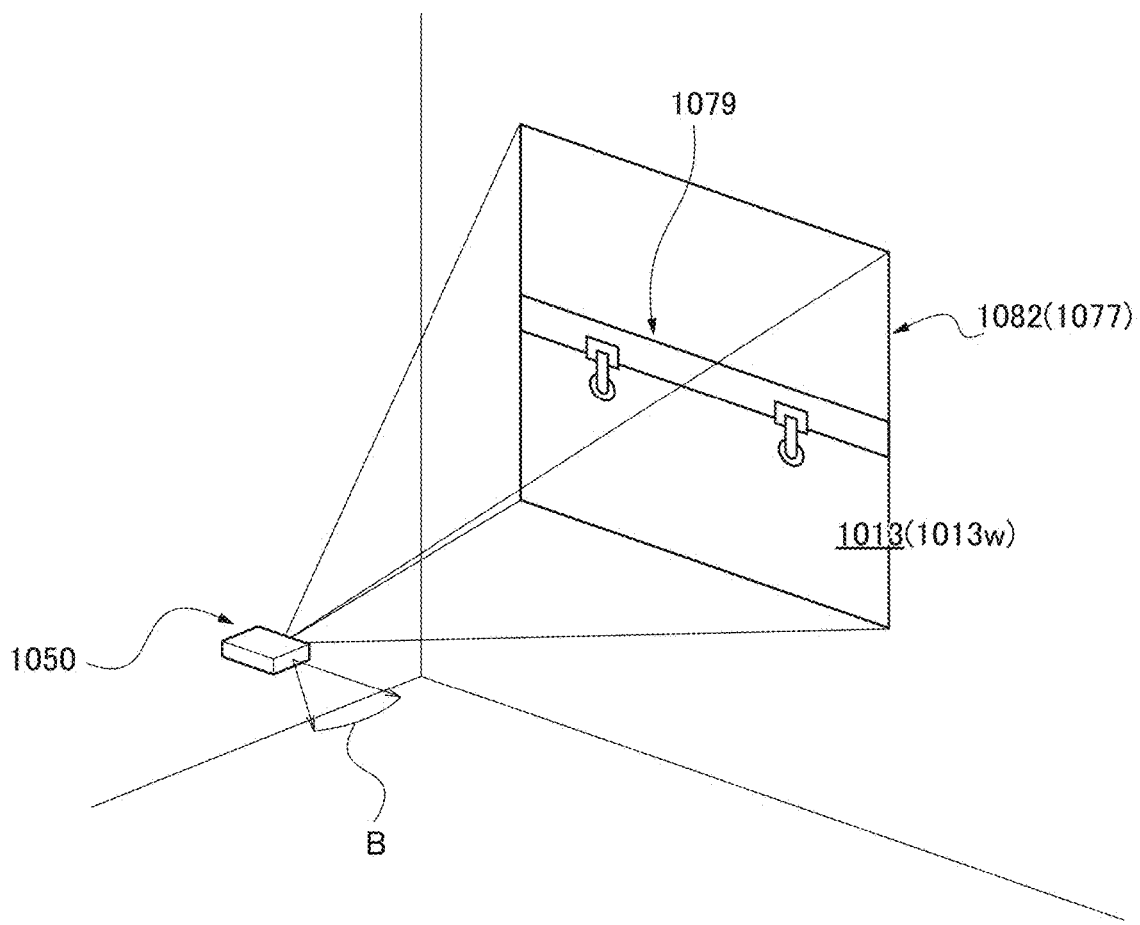
FIG. 32 is an explanation drawing illustrating a structure image projected on a wall.

FIG. 32 shows an example in which the target representing image 1079 showing the position and the shape of a handrail (structure) to be attached is projected on a wall by the measurement information representing device 1050.

The measurement information representing device 1050 illustrated in FIG. 32 projects the target representing image 1079 from the side surface of the casing 1051.

The measurement information representing device 1050 previously stores the data on the shape and the position of the handrail to be attached to the wall. The other configurations are the same as those in Example 1. The description thereof is thus omitted.

According to this example, before the handrail is actually attached to the wall, the position, the shape, and the size of the handrail to be attached to the wall are obtained. The handrail which is actually attached to the wall is recognized.
Embodiment 4

Figure 33:
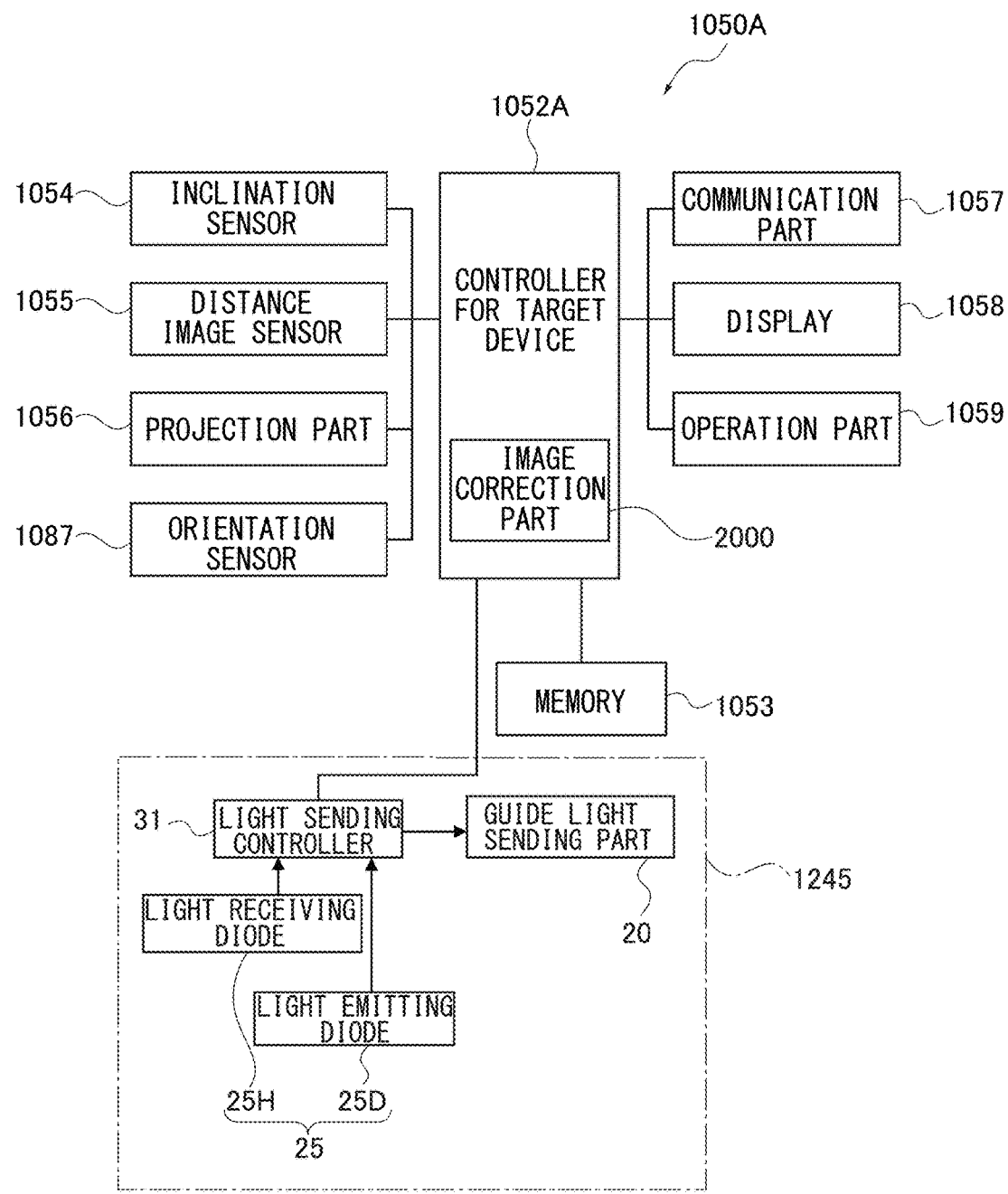
FIG. 33 is a block diagram illustrating a configuration of a measurement information representing device according to Embodiment 4.

FIG. 33 is a block diagram illustrating a configuration of a measurement information representing device 1050A according to Embodiment 4.

The measurement information representing device 1050A includes an orientation sensor 1087 that detects orientations of a detection optical axis of the distance image sensor 1055 and a projection optical axis of the projection part 1056.

The orientation sensor 1087 is fixed to the casing 1051. The orientation of the reference line R3 of the casing 1051 is thereby detected. The orientations of the detection optical axis of the distance image sensor 1055 and the projection optical axis of the projection part 1056 are detected based on the orientation of the reference line R3. Such detection is made based on the fact that the directions of the detection optical axis of the distance image sensor 1055 relative to the reference line R3 and the projection optical axis of the projection part 1056 are previously set.

According to the measurement information representing device 1050A of Embodiment 4, the orientations of the detection optical axis of the distance image sensor 1055 and the projection optical axis of the projection part 1056 are obtained. The coordinate position of the measurement information representing device 1050A and the position (distance and direction) of each target position (measurement and installation point 1072 in FIG. 19) relative to the coordinate position are obtained without directing the casing 1051 (refer to FIG. 30) to the survey instrument 1020 (refer to FIG. 20).

The target information image 1077 associated with the target position is further appropriately projected on the projection plane 1013 regardless of the unevenness and the inclination of the projection plane 1013 (refer to FIG. 23).

In the measurement information representing device 1050A of Embodiment 4, similar to the above, the angle θ of the direction of the survey instrument 1020 is obtained by outputting the fan beam B from the fan beam output device 1245, and the reference line R3 and the direction line F3 are displayed on the display 1058.

According to the embodiments of the present invention, the fan beam is formed without using a cylindrical lens, and the fan beam is moved for scanning.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A fan beam output device comprising:
   a polygon mirror comprising: a plurality of reflection surfaces formed in a circumference surface of the polygon mirror at equal intervals, and a surface processed part that reflects incident laser light to form a fan beam spreading in a predetermined direction, and the surface processed part being provided in each of the reflection surfaces;
   a laser light source that emits laser light toward the reflection surface of the polygon mirror;
   a collimator lens that changes the laser light emitted from the laser light source into parallel light flux;
   a rotation driver that rotates the polygon mirror;
   a rotation position detector that detects a rotation position of the polygon mirror; and
   a light sending controller that controls on / off of the laser light source based on the rotation position detected by the rotation position detector,
   wherein:
   the light sending controller generates the fan beam spreading in a right and left direction from the surface processed part of a predetermined reflection surface of the reflection surfaces of the polygon mirror by controlling the on / off of the laser light source based on the rotation position of the polygon mirror, and
   the fan beam scans in an up and down direction by the rotation of the polygon mirror.

2. The fan beam output device according to claim 1, wherein
   the surface processed part in at least one of the reflection surfaces includes a refractive diffraction grating or a lenticular lens.

3. The fan beam output device according to claim 1 further comprising:
   at least three reflection surfaces of the reflection surfaces, wherein
   in the surface processed part of at least one of the three reflection surfaces, direction of the spreading inclines relative to a rotation axis of the polygon mirror.

4. A survey system comprising:
   a target device including: the fan beam output device according to claim 1, a target that reflects incident tracking light along an incident direction, a display that displays a reference line indicating a previously set reference direction and an obtained target position, and a communication part; and
   a survey instrument including: a guide light receiving part that receives the fan beam output from the fan beam output device, a tracking light receiving part that receives the tracking light reflected by the target to automatically track the target, a horizontal angle detector that detects a horizontal angle of the target relative to a horizontal reference line based on the light received by the tracking light receiving part, a distance measurement part that emits measurement light toward the target and receives the measurement light reflected by the target to obtain a distance to the target, a calculation controller that calculates a position of the target based on the distance obtained by the distance measurement part and the horizontal angle detected by the horizontal angle detector, and a communication part that sends data on the position of the target calculated by the calculation controller, wherein:

the data is sent to the target device by the communication part, the sent data is received by the communication part of the target device, and a present position of the target is displayed on the display, scanning in the up and down direction is provided in the survey instrument, an angle of a survey instrument direction from the target to the survey instrument relative to a reference direction previously set on the display is obtained by the calculation controller based on a light receiving timing of each of the fan beams received by the guide light receiving part, the data on the angle obtained by the calculation controller is sent by the communication part of the survey instrument, the data on the angle is received by a receiving part of the target device, and the reference line on the display is displayed in a position rotated at the angle.

* * * * *